United States Patent [19]

Miki et al.

[11] 4,335,428
[45] Jun. 15, 1982

[54] ELECTRONIC SYSTEM FOR CONTROLLING AN AUTOMATIC TRANSMISSION IN RESPONSE TO CHANGES IN SLOPE

[75] Inventors: Nobuaki Miki; Mutsumi Kawamoto, both of Nagoya; Hiroyuki Amano, Chiryu; Tsuneo Hida, Toyokawa; Tsuyoshi Yoshida, Toyota, all of Japan

[73] Assignee: Aisin-Waker Kabushiki Kaisha, Aichi, Japan

[21] Appl. No.: 115,166

[22] Filed: Jan. 24, 1980

[30] Foreign Application Priority Data

Feb. 14, 1979 [JP] Japan ................................. 54-16483

[51] Int. Cl.³ ...................... G06F 15/20; B60K 41/08
[52] U.S. Cl. ..................................... 364/424; 74/866
[58] Field of Search .................. 364/424, 431; 74/866

[56] References Cited

U.S. PATENT DOCUMENTS

| 4,034,627 | 7/1977 | Mizote | 74/866 |
| 4,082,013 | 4/1978 | Dornfeld et al. | 74/866 |
| 4,131,035 | 12/1978 | Mizuno et al. | 74/866 |
| 4,155,277 | 5/1979 | Minami et al. | 74/866 |
| 4,198,882 | 4/1980 | Kiencke et al. | 74/866 |
| 4,220,059 | 9/1980 | Mizuno et al. | 74/866 X |
| 4,262,335 | 4/1981 | Ahlen et al. | 364/431 |

FOREIGN PATENT DOCUMENTS 6033 12/1979 European Pat. Off. .............. 74/866

Primary Examiner—Felix D. Gruber
Attorney, Agent, or Firm—Sughrue, Mion, Zinn, Macpeak and Seas

[57] ABSTRACT

An electronic system for controlling an automatic transmission having an hydraulic control circuit comprises a large scale integrated semiconductor logic unit, a semiconductor read-only memory, a semiconductor read-write memory and input and output ports as required. The read-only memory fixedly stores standard data indicating the upper and the lower limit value of vehicle speed which correspond to the individual throttle openings of the engine for each shift lever position of a vehicle on which the automatic transmission, the hydraulic control circuit and the electronic system are mounted; slope detecting reference data indicating the vehicle speeds on slopes which correspond to the throttle opening in each shift lever position; slope detecting program data which is utilized to detect a slope as a result of the comparison between the reference data on one hand and the current shift lever position, the current throttle opening and the current vehicle speed; additional program data which is utilized to modify at least part of the standard data in response to a slope detected to produce shift reference data which corresponds to the slope; shift determining program data which determines a speed range to be established in response to the comparison of the current speed range, the current throttle opening and the current vehicle speed against the shift reference data; and shift controlling program data responsive to the determined speed range to control the energization of the solenoid valves.

In accordance with the slope detecting program data, the electronic system detects a slope, and modifies the standard data in response to the slope detected, in accordance with the modifying program data, thus producing a shift reference data, which is then written into the read-write memory. In addition, the electronic system compares against the current speed range, the current throttle opening and the vehicle speed against the shift reference data to determine a speed range to which the transmission is to be switched, generally in accordance with the shift determining program data.

8 Claims, 49 Drawing Figures

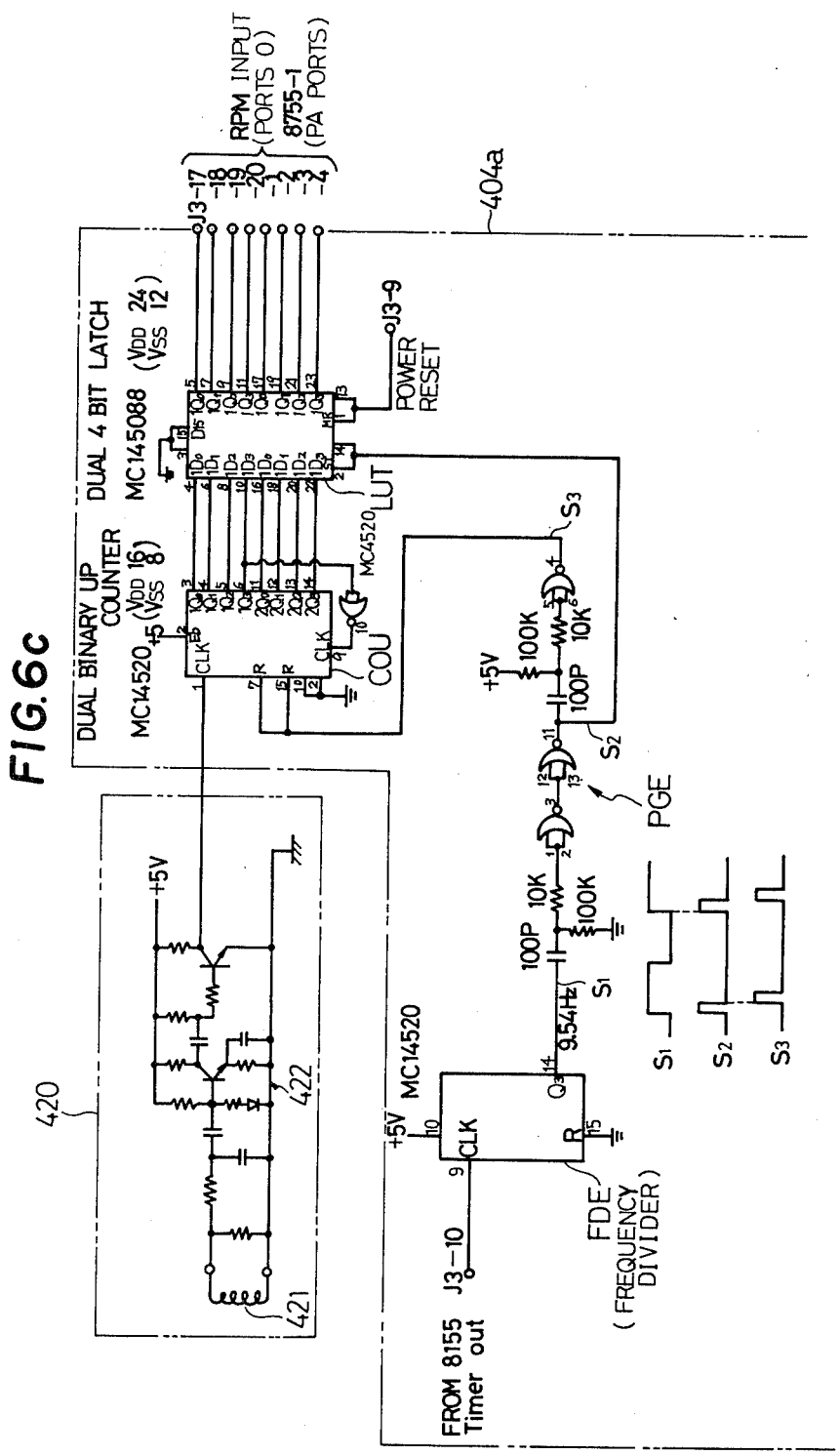

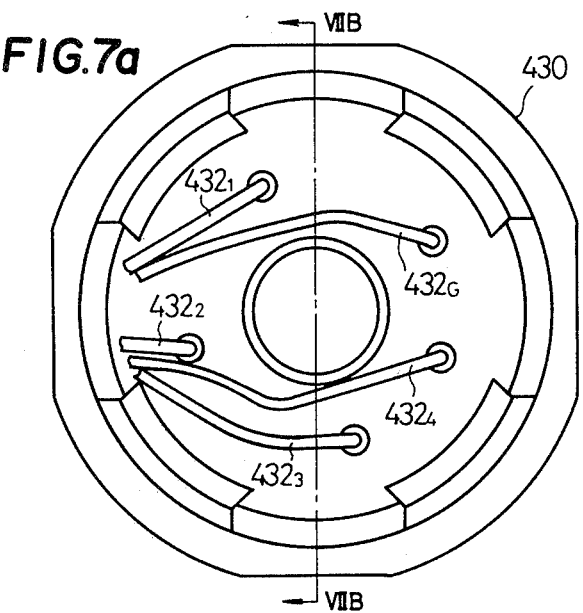
FIG.7a
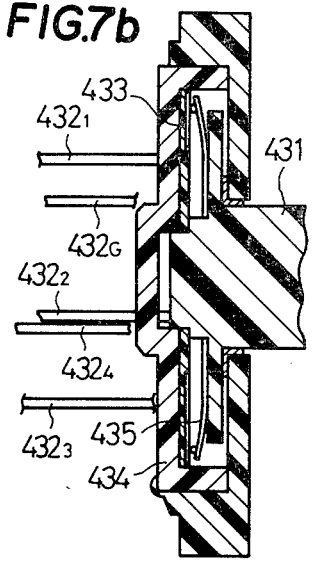
FIG.7b
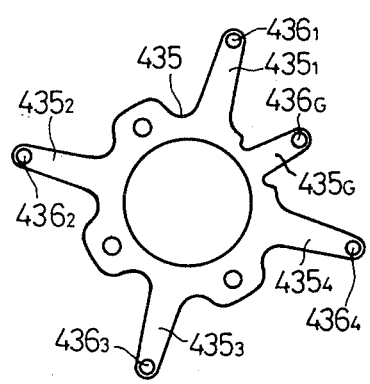
FIG.7d
FIG.7e
| THROTTLE OPENING | OUTPUT CODE | | | |
|---|---|---|---|---|
| | $\theta_4$ | $\theta_3$ | $\theta_2$ | $\theta_1$ |
| 0 | 0 | 0 | 0 | 0 |
| 1 | 0 | 0 | 0 | 1 |
| 2 | 0 | 0 | 1 | 1 |
| 3 | 0 | 0 | 1 | 0 |
| 4 | 0 | 1 | 1 | 0 |
| 5 | 0 | 1 | 1 | 1 |
| 6 | 0 | 1 | 0 | 1 |
| 7 | 0 | 1 | 0 | 0 |
| 8 | 1 | 1 | 0 | 0 |
| 9 | 1 | 0 | 0 | 0 |
| 10 | 1 | 0 | 0 | 1 |
| 11 | 1 | 1 | 0 | 1 |
| 12 | 1 | 1 | 1 | 1 |
| 13 | 1 | 1 | 1 | 0 |
| 14 | 1 | 0 | 1 | 0 |
| 15 | 1 | 0 | 1 | 1 |

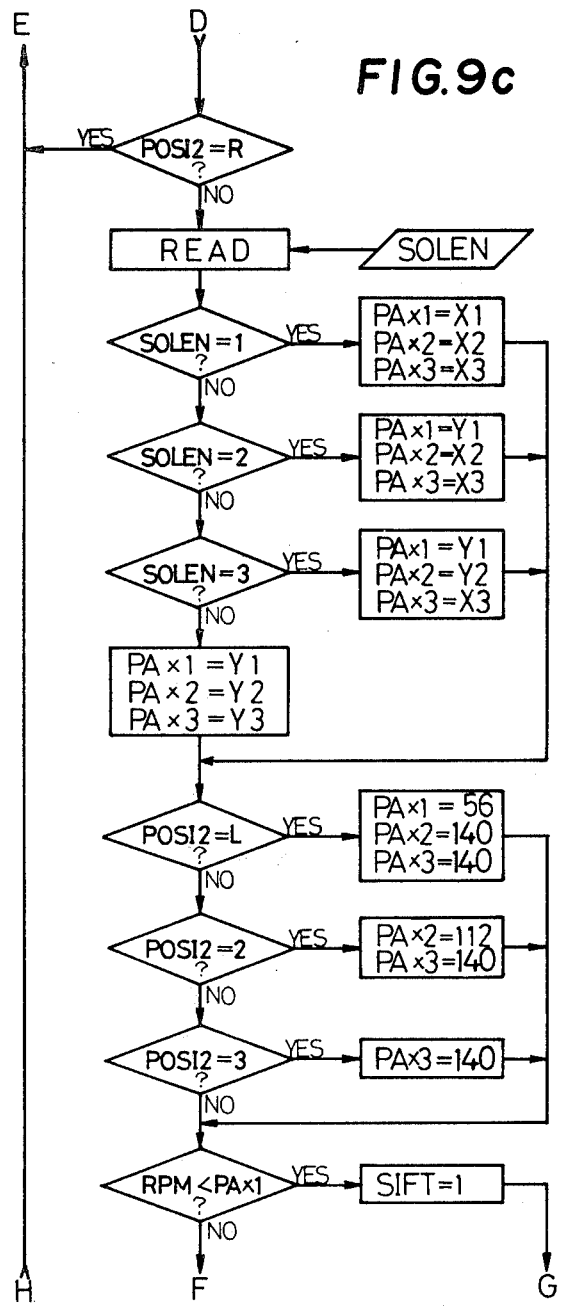

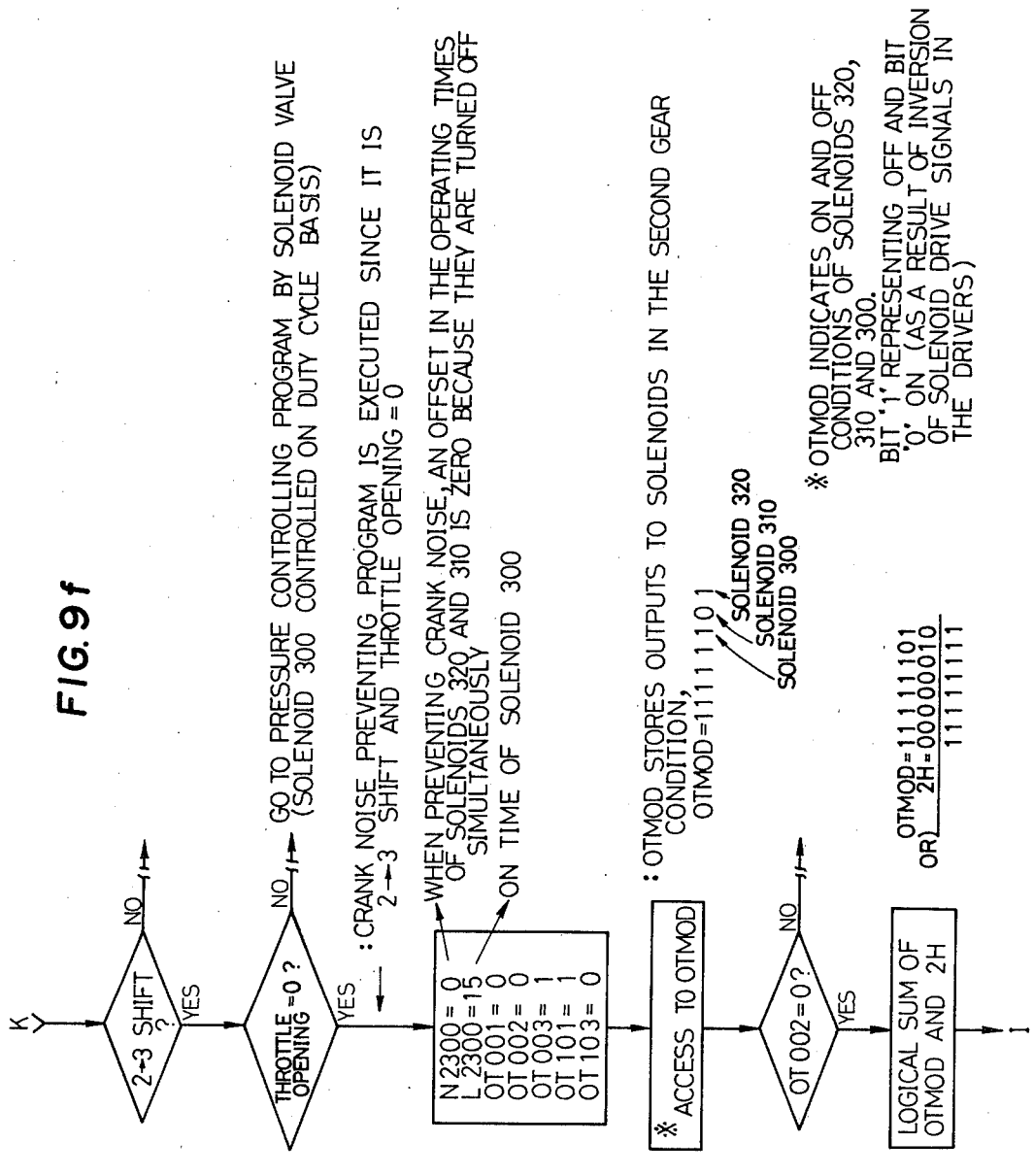

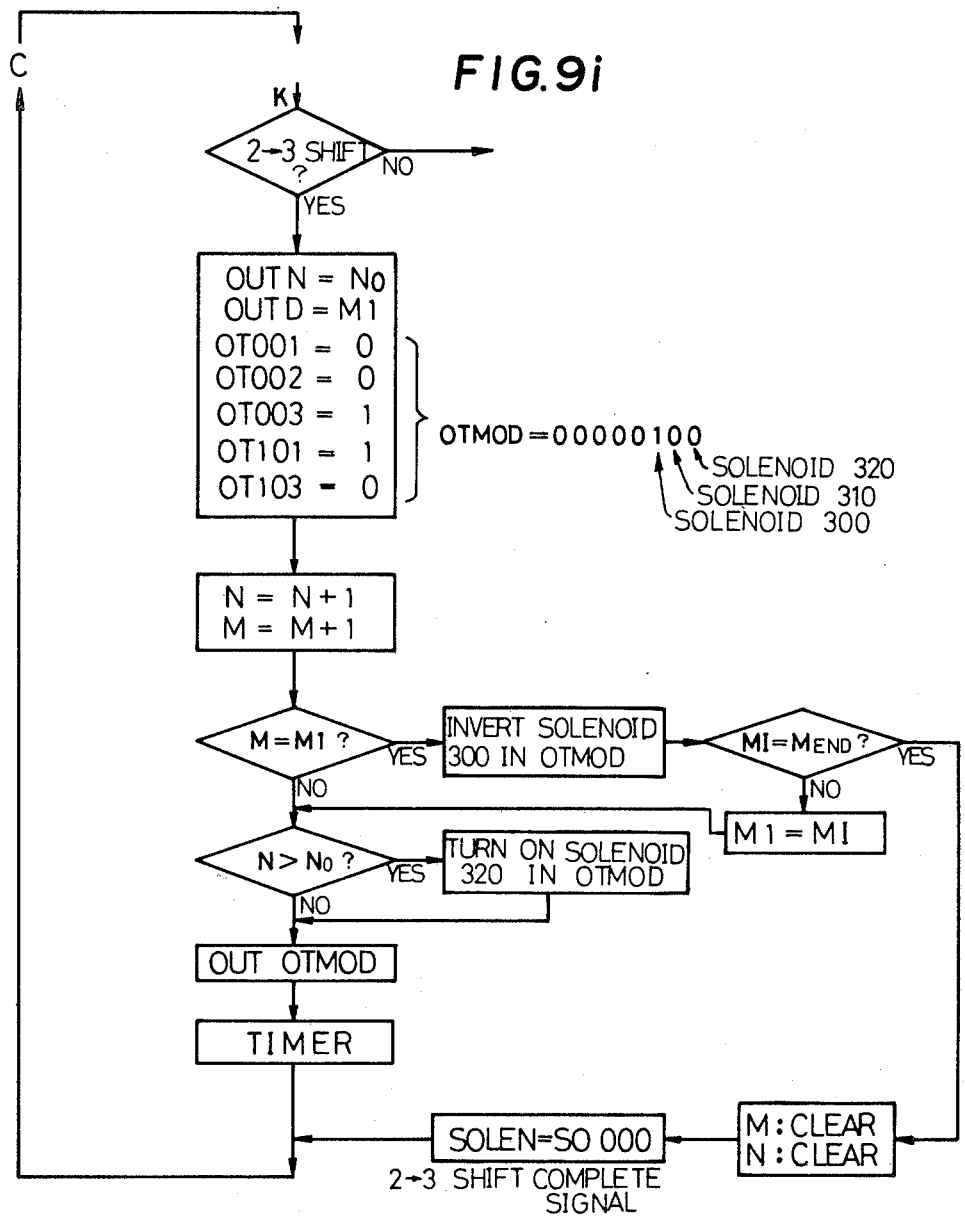

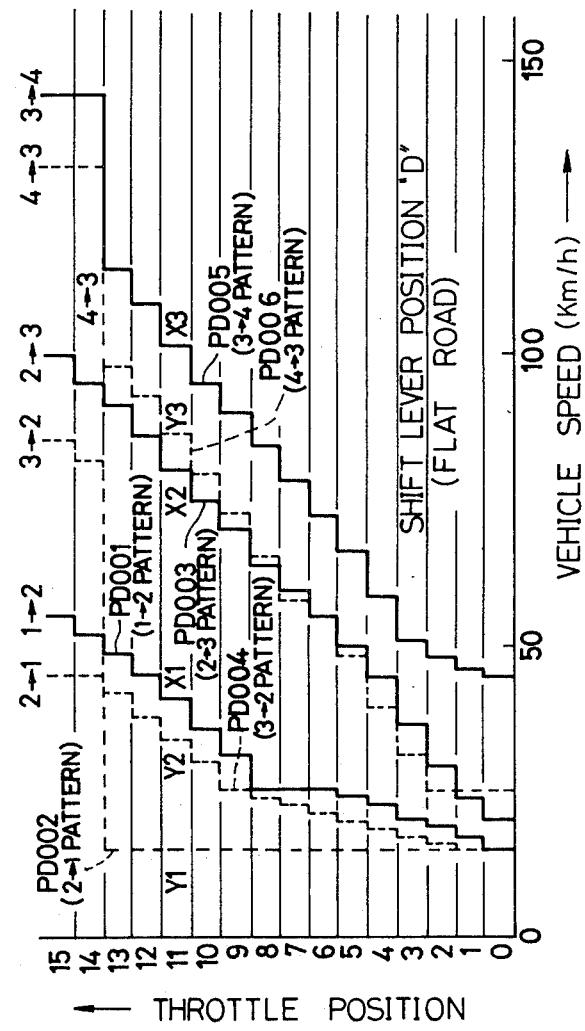

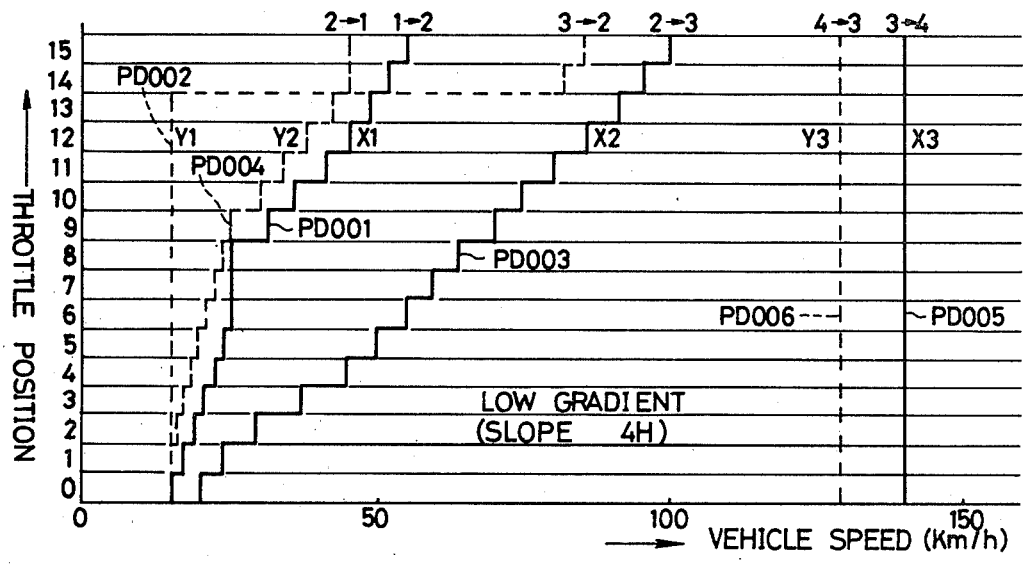
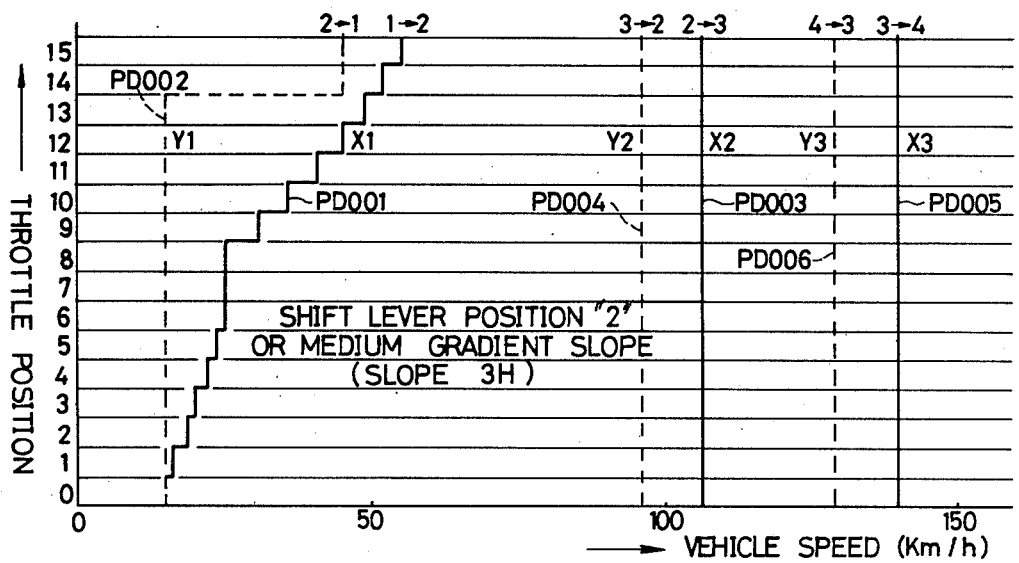

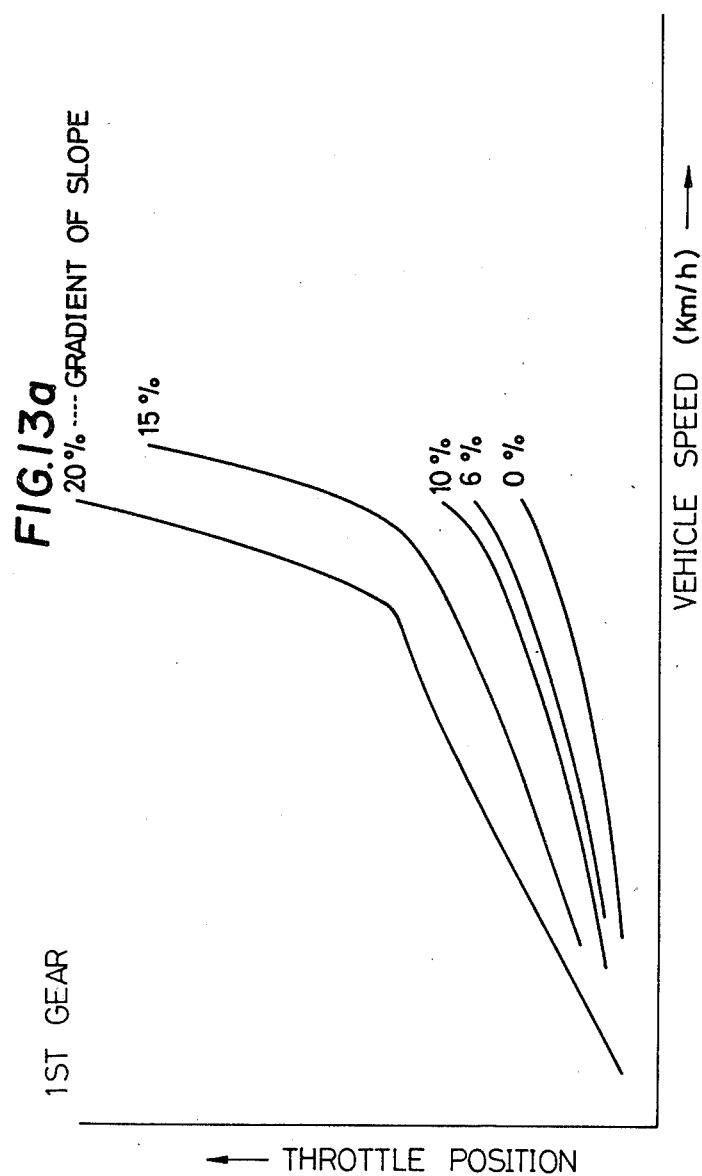

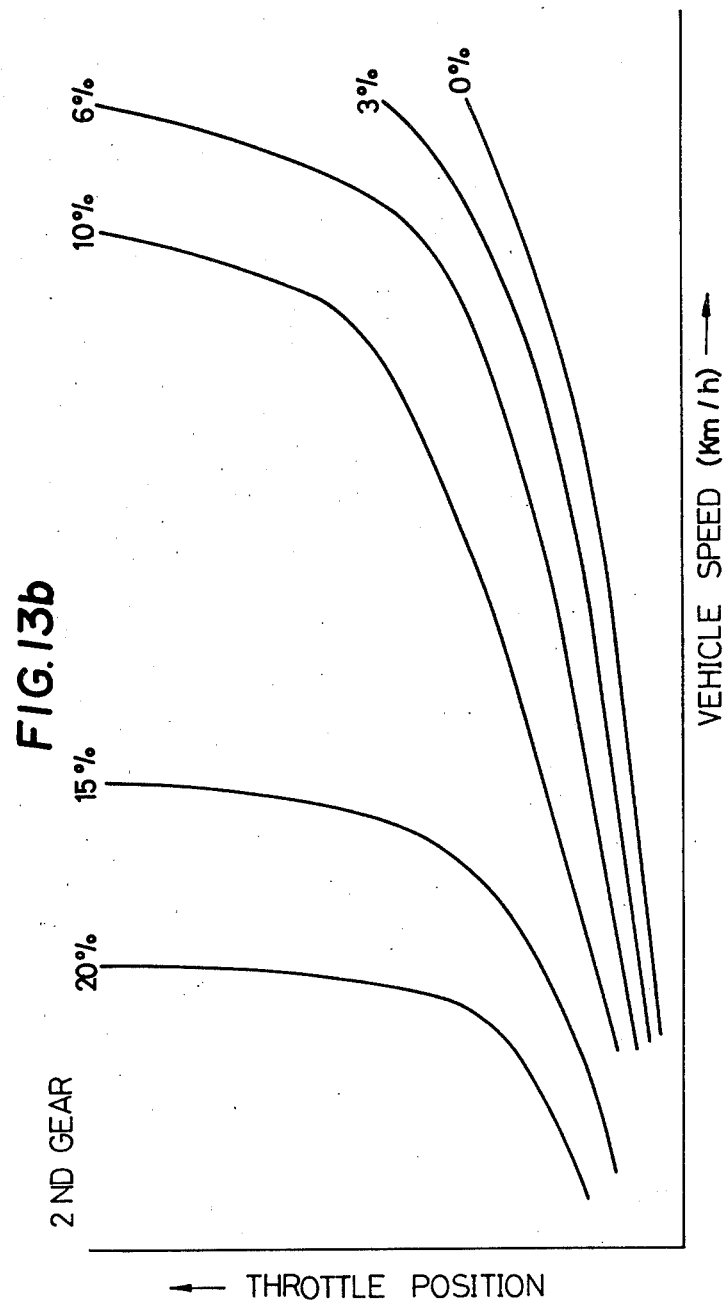

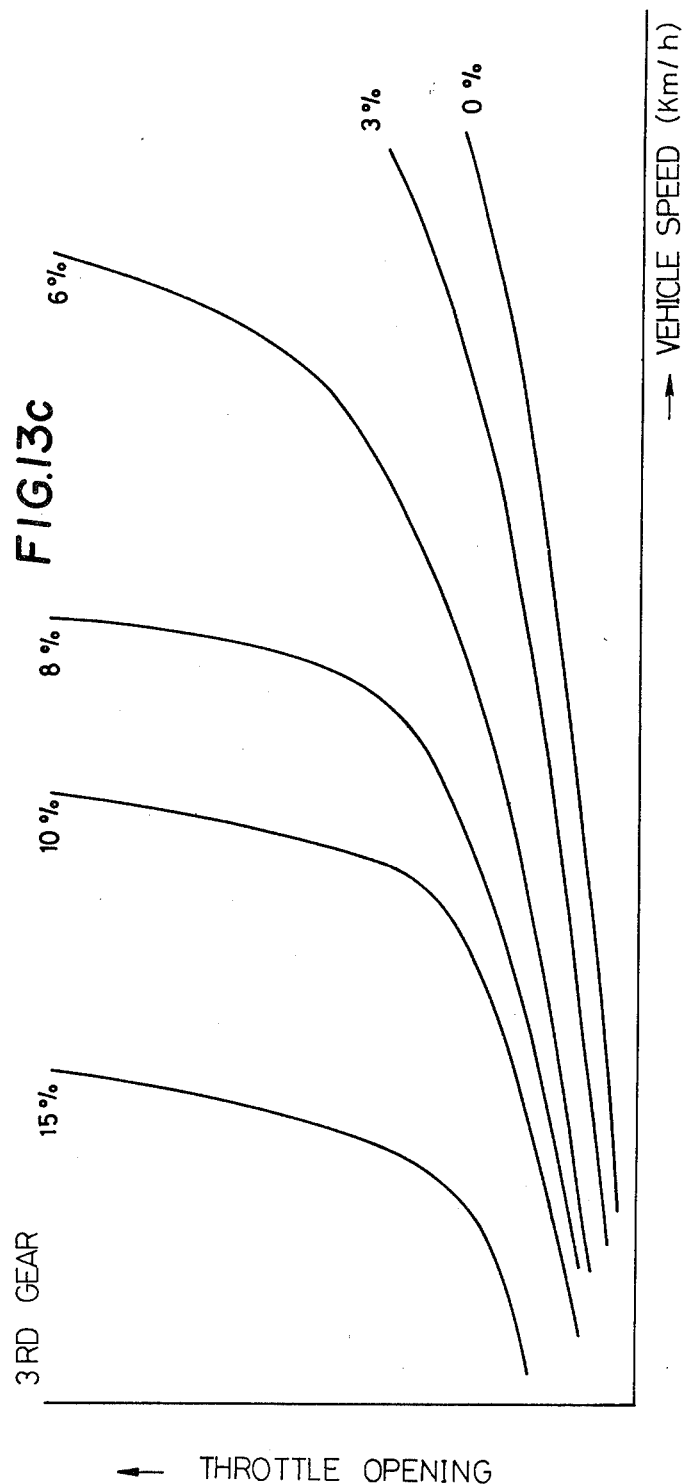

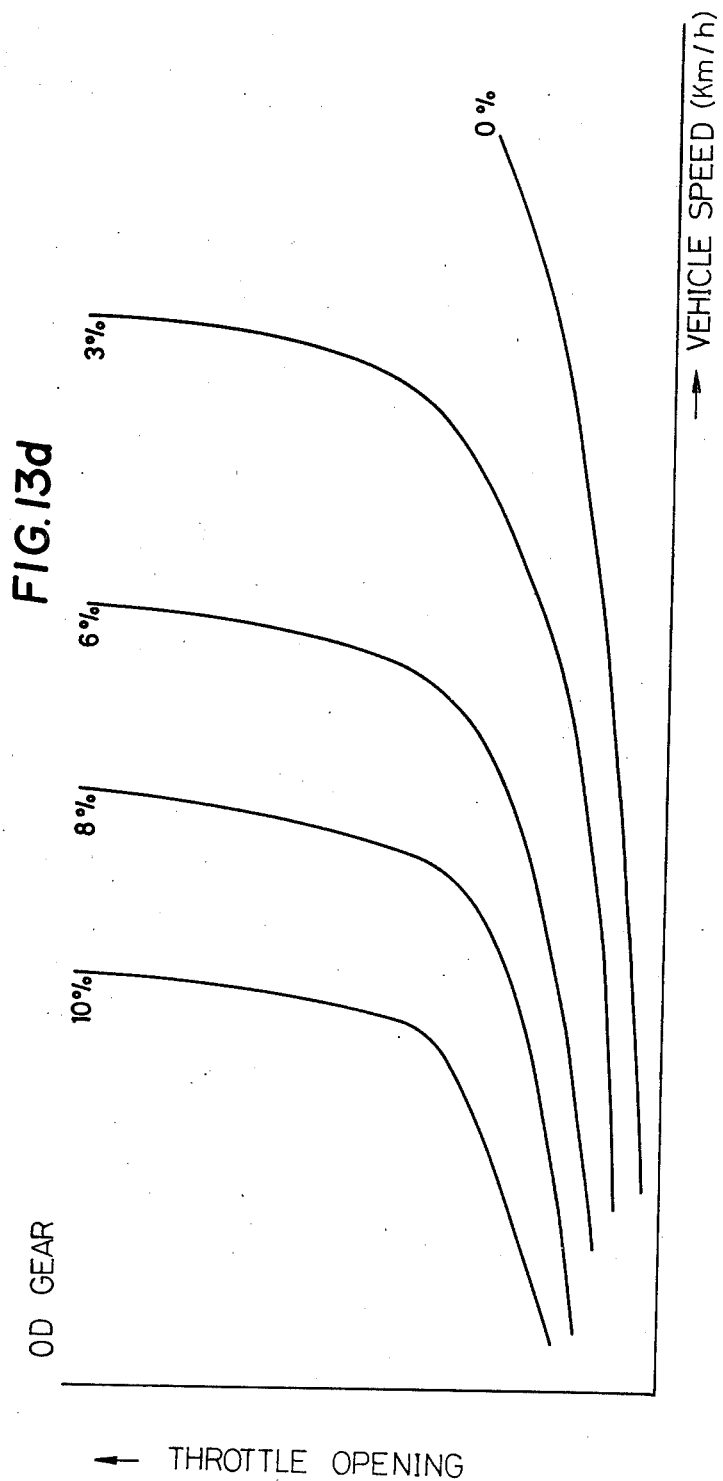

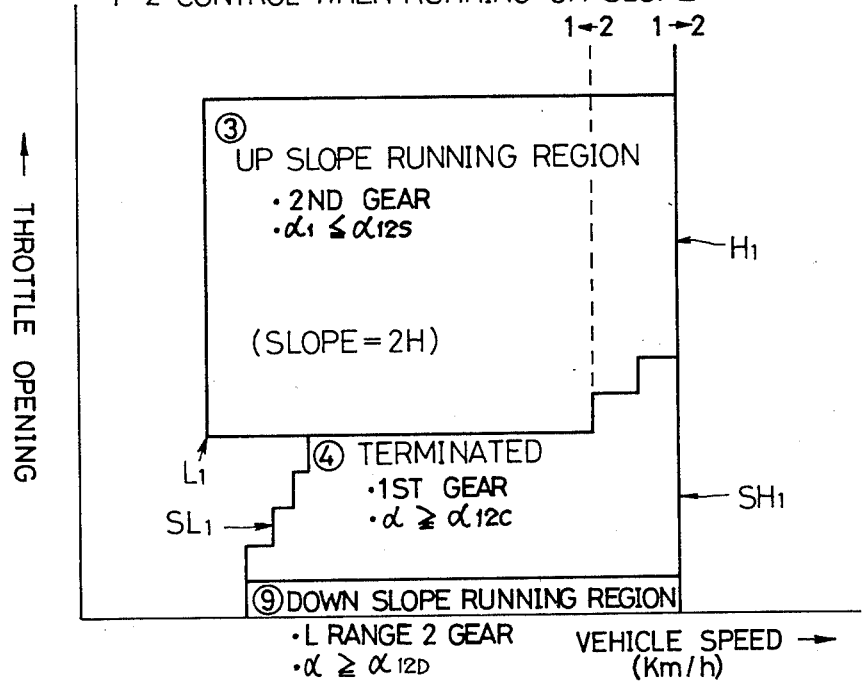

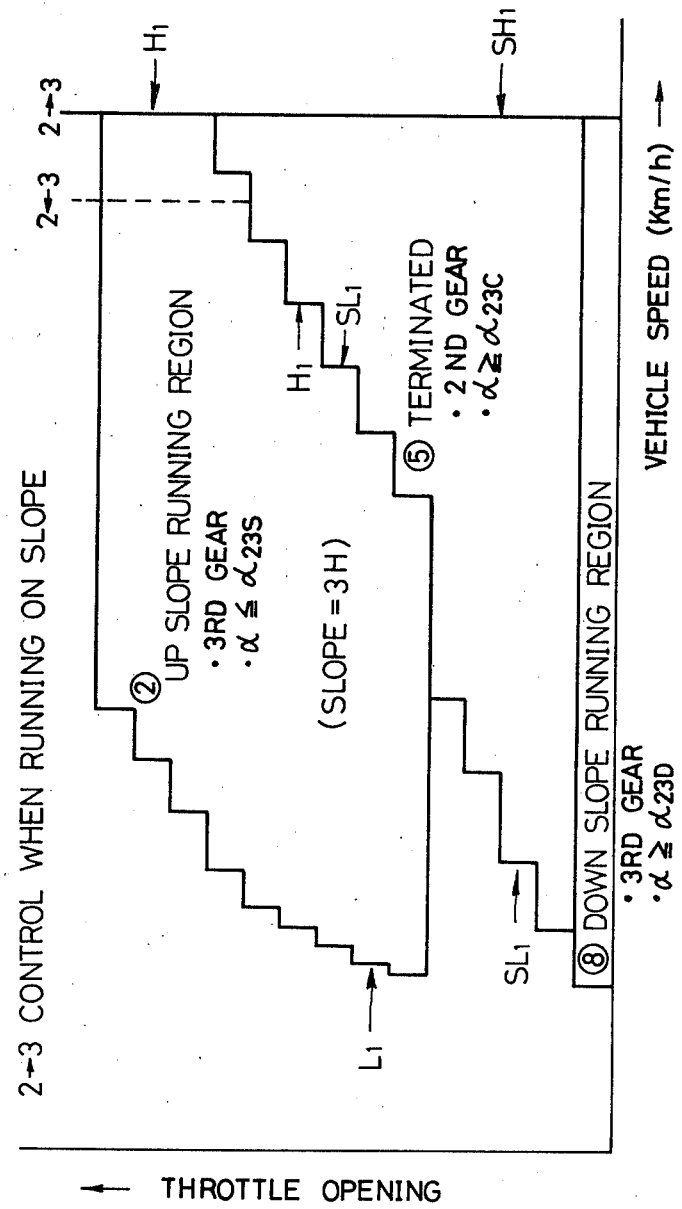

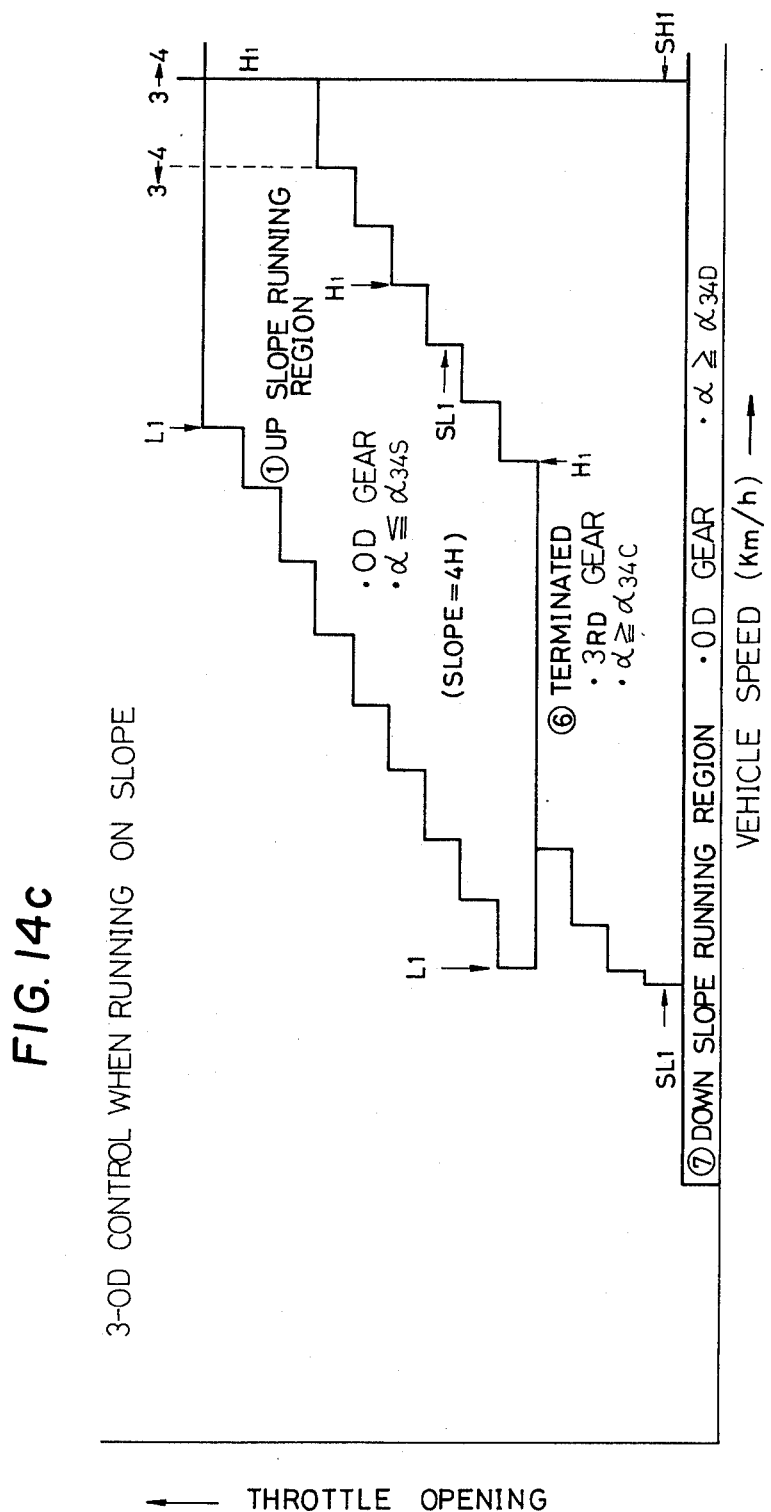

ELECTRONIC SYSTEM FOR CONTROLLING AN AUTOMATIC TRANSMISSION IN RESPONSE TO CHANGES IN SLOPE

CROSS REFERENCE TO RELATED APPLICATIONS

The present application is related to copending application Ser. Nos. 114,936, filed Jan. 24, 1980 and 116,133, filed Jan. 28, 1980.

BACKGROUND OF THE INVENTION

The invention relates to an electronic system for controlling the operation of an automatic, variable speed transmission of a vehicle, and in particular, to an electronic shift control system which automatically determines a speed stage or gear ration to be changed in accordance with the throttle opening and the vehicle speed and in which the switching to the desired speed stage or gear ratio is automatically achieved by a selective energization of solenoid valves contained in an oil pressure circuit.

In a vehicle having an automatic, variable speed transmission mounted thereon, a speed stage or gear ratio is determined on the basis of a throttle opening and a vehicle speed, and when a throttle opening and a vehicle speed reaches a preset region, a shift or speed change takes place automatically. However, because of a limited number of reference data or patterns of a throttle opening vs. vehicle speed which can be relied upon to determine the speed change, there have been certain inconveniences experienced in the prior art arrangement. By way of example, when moving from a flat road to an up slope, a driver will recognize a reduction in the vehicle speed, and accordingly depresses an accelerator pedal in order to maintain the vehicle speed. This results in a down shift to a lower speed stage, increasing the driving power. Consequently, the vehicle speed increases, but when the intended vehicle speed is exceeded, the accelerator pedal is partially released. Thereupon, there results an up shift to a higher speed stage or gear ratio. An operation of the accelerator pedal in this manner results in a so-called hunting, that is, a frequent repetition of speed changes. When running on a down slope, a lesser magnitude of the driving power is sufficient, so that the accelerator pedal is generally partially released. This results in an up shift to a higher speed stage or gear ratio, causing an unintended increase in the vehicle speed since an engine brake operation cannot be activated, requiring a frequent use of a brake.

SUMMARY OF THE INVENTION

It is a first object of the invention to provide an electronic shift control system which automatically detects a loading condition when running on a slope.

It is a second object of the invention to provide an electronic shift control system which responds to a loading condition when running on a slope to rewrite shift reference data automatically.

It is a third object of the invention to provide a shift control system which automatically detects a loading condition when running on a slope and constrains or releases a speed change depending on the loading condition.

It is a fourth object of the invention to provide an electronic shift control system in which the detection of a loading condition when running on a slope, the determination of a speed range depending on the loading condition and the control of the shift operation are performed in a reasonable and extensive manner based on fixed program data stored in a semiconductor read-only memory in which reference data for arithmetic operations is also fixedly stored.

In accordance with the invention, an electronic shift control system comprises a large scale integrated semiconductor logic unit, a read-only memory, a read-write memory, and input and output ports as required. The read-only memory stores standard data indicative of the values of the upper and the lower limit of the vehicle speed corresponding to individual throttle openings of the engine for each of different running ranges or shift lever positions of a vehicle on which the automatic, variable speed transmission, the hydraulic control circuit and the electronic system are mounted; slope detecting reference data indicative of vehicle speeds when running on slopes which correspond to the throttle openings in different running ranges; slope detecting program data which is utilized to detect the presence of a slope by comparing the actual running range, the current throttle opening and the actual speed of the vehicle against the slope detecting reference data; another program data which may be utilized to modify at least part of the standard data to produce a shift reference data which corresponds to a slope in response to the detection of the slope shift determining program data which determines a speed range to which the transmission is to be switched as a result of a comparison of the current speed range, the current throttle opening and the current vehicle speed against the shift reference data; and shift controlling program data which responds to the determined shift to control the energization of the solenoid valves.

A signal indicative of a shift lever position is applied to the electronic system from shift lever position detecting means. A signal indicative of an actual vehicle speed is also applied thereto from vehicle speed signal generating means. Also, a signal indicative of a throttle opening is applied thereto from throttle opening detecting means. In accordance with the slope detecting program data, the electronic system detects the presence of a slope, and modifies the standard data according to the modifying program data to produce shift reference data, which is then written into the read-write memory. In addition, the electronic system determines a speed range which is to be established by comparing the current speed range, the current throttle opening and the current vehicle speed against the shift reference data in accordance with the shift determining program data, and utilizes the shift controlling program data to control the energization of the solenoid valves, thus achieving a switching of the speed range or shift lever position.

Above and other advantages of the invention will become apparent from the following detailed description with reference to the attached drawings, wherein similar parts are designated by like reference characters.

BRIEF DESCRIPTION OF THE DRAWINGS

FIG. 6c is a circuit diagram of a vehicle speed detecting circuit;

FIG. 7a is a plan view of a throttle opening sensor;

FIG. 7b is a cross section taken along the line VIIB—VIIB shown in FIG. 7a;

FIG. 7d is a plan view of a slider;

FIG. 7e is a chart indicating the output codes of the throttle opening sensor;

FIG. 8b is an enlarged cross section taken along the line IIXB—IIXB shown in FIG. 8a;

FIGS. 9a, 9b, 9c and 9d are flow charts illustrating a control flow to switch the speed stages;

FIGS. 9f, 9g and 9h are more detailed flow charts thereof;

FIG. 9i is a flow chart illustrating a control of the hydraulic pressure by the solenoid valve;

FIG. 11a shows the standard data stored in ROM, shown in terms of graphs;

FIGS. 11b, 11c and 11d show the shift reference data which are written into RAM as a result of modification of the data shown in FIG. 11a;

FIGS. 13a, 13b, 13c and 13d graphically show the relationship between the throttle opening and the vehicle speed for different values of the gradient of the slopes in first to fourth gears, respectively;

FIGS. 14a, 14b and 14c graphically show the slope running regions and flat road running region when running in different gears;

DESCRIPTION OF PREFERRED EMBODIMENT

Figure 1:
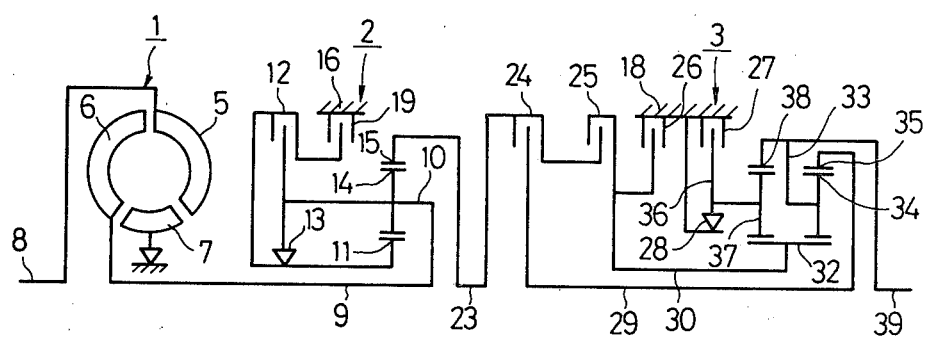
FIG. 1 is a schematic view showing an example of a transmission to which the invention may be applied.
Figure 2:
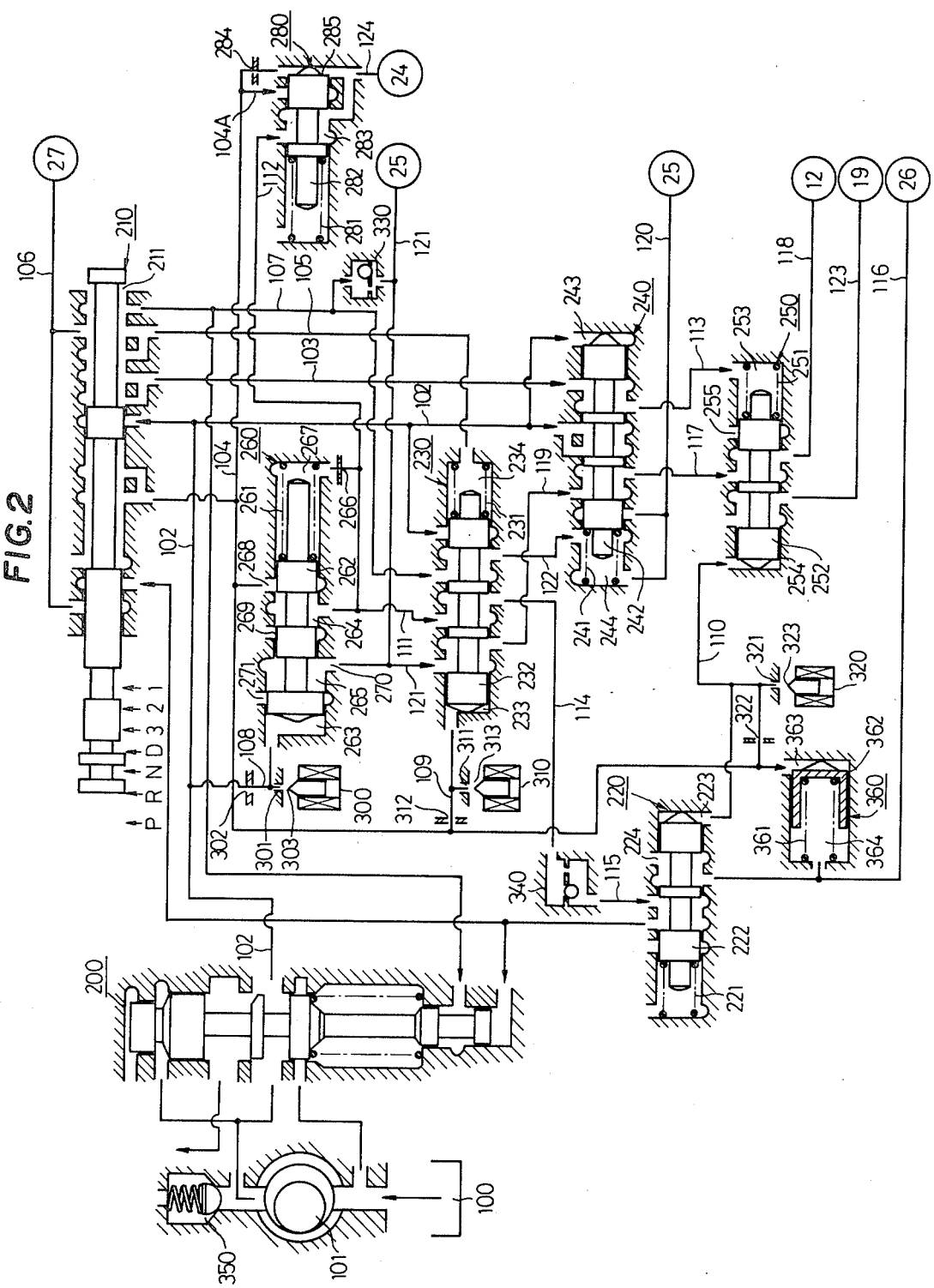
FIG. 2 is a schematic diagram of an oil pressure control circuit for the transmission.

Referring to FIG. 1, there is shown an automatic, variable speed transmission of hydraulic type with an overdrive unit which represents an example of the transmission to which the invention may be applied. The transmission comprises a torque converter 1, an overdrive mechanism 2, and a change gearing 3 including three forward stages and a single reverse stage. The transmission is adapted to be controlled by an oil pressure circuit as shown in FIG. 2. The torque converter 1 is constructed in a conventional manner and includes a pump 5, a turbine 6 and a stator 7. The pump 5 is connected to a crankshaft 8 of an engine while the turbine 6 is connected to a turbine shaft 9, which represents the output shaft of the torque converter 1. The turbine shaft 9 is connected as an input shaft of the overdrive mechanism 2, and is specifically connected to a carrier 10 of an epicyclic gearing of the overdrive mechanism. The carrier 10 rotatably carries a planetary pinion 14 which meshes with a sun gear 11 and a ring gear 15. Interposed between the sun gear 11 and the carrier 10 are a multiple disc clutch 12 and one way clutch 13. Another multiple disc brake 19 is interposed between the sun gear 11 and a housing which surrounds the overdrive mechanism or overdrive casing 16.

The ring gear 15 of the overdrive mechanism 2 is connected to an input shaft 23 of the change gearing 3. A multiple disc clutch 24 is interposed between the input shaft 23 and an intermediate shaft 29 while a multiple disc clutch 25 is interposed between the input shaft 23 and a sun gear shaft 30. A multiple disc brake 26 is interposed between the sun gear shaft 30 and a transmission casing 18. A sun gear 32 is mounted on the sun gear shaft 30 and forms a pair of epicyclic trains together with a carrier 33, a planetary pinion 34 carried by the carrier 33, a ring gear 35 meshing with the pinion 34, another carrier 36, a planetary pinion 37 carried by the carrier 36, and a ring gear 38 meshing with the pinion 37. The ring gear 35 in one of these epicyclic trains is connected to the intermediate shaft 29. The carrier 33 of this epicyclic train is connected with the ring gear 38 in the other epicyclic train, and such carrier and ring gear are connected to an output shaft 39. Interposed between the carrier 36 of the other train and the transmission casing 18 are multiple disc brake 27 and one way Clutch 28.

The various clutches and brakes of the described hydraulic transmission are engaged or disengaged in accordance with the engine output and the vehicle speed by means of an oil pressure circuit which will be described in more detail later, thereby changing speeds between the four forward stages including the overdrive (O/D) and a single reverse stage which takes place by a manual switching.

The various positions of the change gearing or the shift lever and the corresponding operating conditions of the clutches and the brakes are indicated in the table I below.

TABLE I

| Shift Position | Frictional Engaging Device | | | | | | One way clutches | |
|---|---|---|---|---|---|---|---|---|
| | Clutch 12 | Clutch 24 | Clutch 25 | Brake 19 | Brake 26 | Brake 27 | 13 | 28 |
| Parking (P) | O | X | X | X | X | O | | |
| Reverse (R) | O | X | O | X | X | O | Locked | Locked |
| Neutral (N) | O | X | X | X | X | X | | |
| Forward | | | | | | | | |
| D   1st | O | O | X | X | X | X | Locked | Locked |
|     2nd | O | O | X | X | O | X | Locked | Overrun |
|     3rd | O | O | O | X | X | X | Locked | Overrun |
|     O.D. | X | O | O | O | X | X | Over-run | Overrun |
| 3   1st | O | O | X | X | X | X | Locked | Locked |
|     2nd | O | O | X | X | O | X | Locked | Overrun |
|     3rd | O | O | O | X | X | X | Locked | Overrun |
| 2   1st | O | O | X | X | X | X | Locked | Locked |
|     2nd | O | O | X | X | O | X | Locked | Overrun |
| L | O | O | X | X | X | O | Locked | Locked |

In the above table, a circle represents an engaged condition of a clutch or a brake while a cross indicates its disengagement.

FIG. 2 shows an example of an oil pressure circuit which selectively operates the clutches and brakes 12, 19, 24, 25, 26 and 27 of the automatic transmission shown in FIG. 1 and which also provides a pressure regulation or control during an automatic or manual shifting.

The oil pressure circuit includes an oil reservoir 100, an oil pump 101, a pressure regulating valve 200, a manual valve 210, 1-2 shift valve 220, 2-3 shift valve 230, 3-4 shift valve 250, 2-3 solenoid valve 310, 1-2 and 3-4 solenoid valve 320, flow control valves, 330 340, a relief valve 350, an accumulator 360, a pressure controlling solenoid valve 300, a valve 260 for suppressing an impulse, N-D shift control valve 280, 2-3 shift control valve 240 and a number of oil paths which are provided to provide a communication between various valves. The oil pump 101 pumps the oil from the reservoir 100, which is then adjusted to a given oil pressure by the pressure regulating valve 200 and fed to an oil path 102.

The manual valve 210 is connected to a shift lever which is disposed within a driver's room, and is movable to P, R, N, D, 3, 2 and L positions corresponding to the various speed ranges of the shift lever by a manual operation. In the N-position, the oil path 102 is closed, allowing only the clutch 12 to be engaged. In the D-position, the oil path 102 communicates with an oil path 104 while in the 3- and 2-position, the oil path 102 communicates with oil paths 103, 104. In the L-position, the oil path 102 communicates with oil paths 103, 104, 105 and 106 while in the R-position, the oil path 102 communicates with oil paths 103, 105, 106 and 107.

Figure 4:
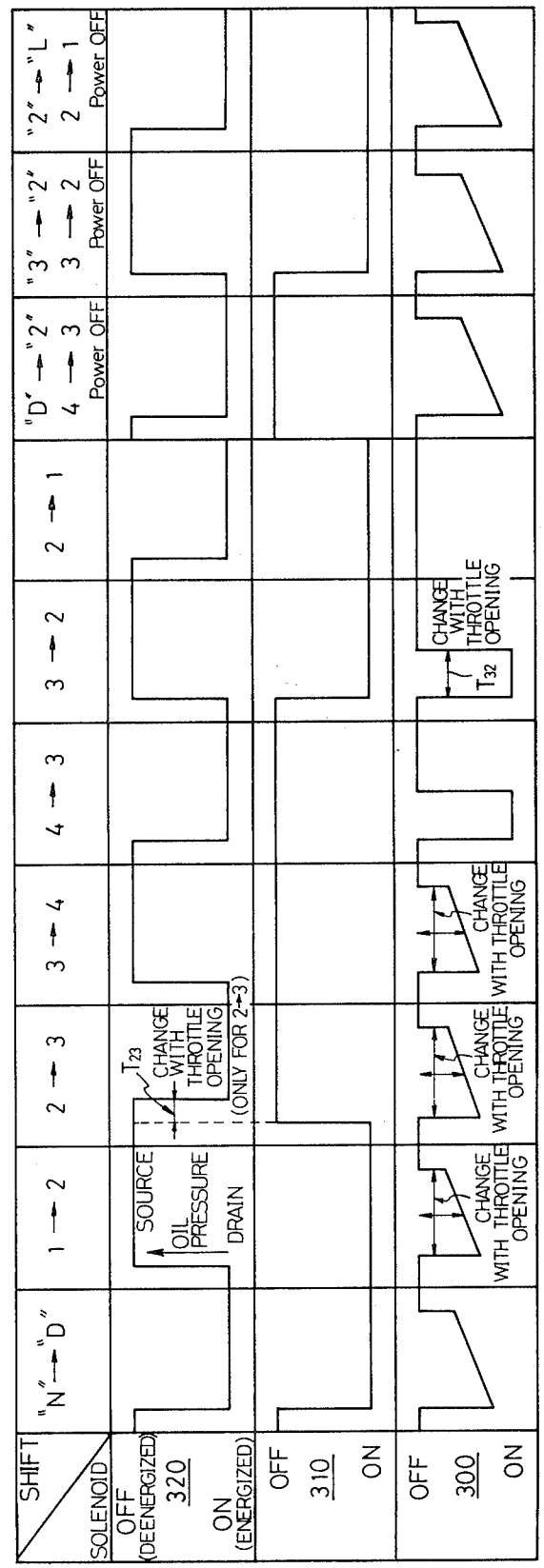
FIG. 4 are timing diagrams indicating the energization of selected solenoid valves shown in FIG. 2 at various speed stages.

The pressure controlling solenoid valve 300 is controlled to open or close with a given period or periods in response to an output from an electronic digital control system 400 to be described later. When it is deenergized, it closes an opening 301 to produce an oil pressure in an oil path 108 which communicates with the oil path 102 through an orifice 302. When it is energized, it opens the opening 301 to drain hydraulic oil from the oil path 108 to a drain port 303, thus producing a pattern of oil pressure changes in the oil path 108 during a shift operation as shown in FIG. 4.

The 2-3 solenoid valve 310 closes an opening 311 to produce an oil pressure in an oil path 109 which communicates with the oil path 104 through an orifice 312 when it is deenergized, but opens the openings 311 to drain the hydraulic oil from the oil path 109 to a drain port 313 when it is energized.

The 1-2 and 3-4 solenoid valve 320 closes an opening 321 to produce an oil pressure in an oil path 110 which communicates with the oil path 104 through an orifice 322 when it is deenergized, but opens the opening 321 to drain the hydraulic oil from the oil path 110 to a drain port 323 when it is energized.

The relationship between the energization (E) and deenergization (Not) of the solenoid valves 310 and 320 and the associated gear condition is indicated in the Table II below.

TABLE II

| | N | 1 | 2 | 3 | 4 |
|---|---|---|---|---|---|
| Solenoid valve 310 | Not | E | E | Not | Not |
| Solenoid valve 320 | Not | E | Not | E | Not |

The valve 260 comprises a spool 262 which is urged by a spring 261 located on one side thereof, an actuating oil chamber 263 connected to the oil path 108, a first pressure controlling oil chamber 264, a second pressure controlling oil chamber 265, and a second actuating oil chamber 267 to which the oil pressure from the first oil chamber 264 is fed back through an orifice 266. During a shift operation, a pattern of oil pressure which is produced in the actuating oil chamber 263 which is connected to the oil path 108 is converted into a position of the spool 262 which is urged by the oil pressure in the second actuating oil chamber 267 and by the resilience of the spring 261 to thereby control the area of opening of an oil feed port 268 connected with the oil path 104 and of an oil drain port 269 in the first pressure controlling chamber 264 to control the oil pressure in an oil path 111 during a forward mode and to control the area of opening of an oil feed port 270, connected to an oil path 121 which is in turn connected to the oil path 107 through the flow control valve 330, as well as of an oil drain port 271 in the second pressure controlling chamber 265 to control the oil pressure in an oil path 121 during a reverse mode. In this manner, a smooth engagement of the clutch 25 is assured, preventing impulses from occurring during a shift operation.

Although the second actuating oil chamber 267 is not essential, its provision allows the oil pressure from the first pressure controlling chamber 264 to be fed back, thus enabling a more reliable control over the pattern of regulated oil pressure during a forward mode and improving the effect of preventing impulses during a shift operation.

The N-D shift control valve 280 comprises a spool 282 urged by a spring 281 located on one side thereof, an oil chamber 283 connected to an oil path 112 which represents a branch from the oil path 111, and an actuating oil chamber 285 connected to the oil path 104 through an orifice 284 and which is directly connected to the oil path 104 through an oil path 104A which represents a branch from the oil path 104 whenever the spool 282 assumes its leftmost position as viewed in FIG. 2. The oil chambers 283 and 285 are connected to a servo mechanism of the clutch 24 through an oil path 124. The spool 282 assumes its rightmost position shown when the manual valve 210 assumes N-position (or range), and assumes a leftmost position when the manual valve 210 is in its D-position.

The 2-3 shift valve 230 comprises a spool 232 urged by a spring 231 located on one side thereof. For the first and the second speed stage, the solenoid valve 310 is energized, producing no oil pressure in the oil path 109. Hence the spool 232 is driven to its leftmost position shown by the spring 231. For the third and the fourth speed stage, the solenoid valve 310 is deenergized, so that an oil pressure is produced within the oil path 109 and the oil chamber 233 to drive the spool 232 to its rightmost position, as viewed in FIG. 2.

The 1-2 shift valve 220 comprises a spool 222 which is urged by a spring 221 located on one side thereof. For the first and the third speed stage, the solenoid valve 320 is energized, producing no oil pressure in an oil path 110, so that the spool 222 is urged by the spring 221 to its rightmost position shown while for the second and the fourth speed stage, the solenoid valve 320 is deenergized, producing an oil pressure in the oil path 110 and the oil chamber 223 to drive the spool 222 to its leftmost position.

The 2-3 shift control valve 240 comprises a spool 242 which is urged by a spring 241 located on one side thereof. For the first and the second speed stage, the oil pressure of the oil path 102 is supplied to an oil chamber 243, whereby the spool 242 is driven to its leftmost position while for the third and the fourth speed stage, the oil pressure of an oil path 122 which communicates with the oil path 102 is fed to an oil chamber 244, whereby the spool 242 is fixed to its rightmost position.

The 3-4 shift valve 250 comprises a spool 252 urged by a spring 251 located on one side thereof. For the first and the second speed stage, an oil pressure is supplied to an oil chamber 253 from an oil path 113 which communicates with the oil path 102, whereby the spool 252 is driven to its leftmost position shown. For the third speed stage, a movement of the 2-3 shift control valve 240 provides a communication between the oil paths 103 and 113, so that the oil pressure in the oil chamber 253 is discharged if the manual valve 210 assumes its D-position. For the fourth speed stage, the solenoid valve 320 is deenergized, producing an oil pressure in the oil path 110 and an oil chamber 254, whereby the spool 252 is driven to its rightmost position.

The operation of the oil pressure control circuit will now be described. In the N-position of the manual valve, the solenoid valves 300, 310 and 320 remain deenergized, whereby the pressure in the oil path 102 is fed through oil paths 117, 118 to cause an engagement of the clutch 12. When shifting to its D-position manually, the hydraulic oil will be supplied to the clutch 24 and the accumulator 360 through the oil path 104 for the first speed stage, and the accumulator 360 maintains a suitable pressure to assure a smooth engagement of the clutch 24 for a given time until the accumulation of the pressure within the oil chamber 363 is completed. The oil path 104 and the clutch 24 are connected together through the orifice 284, the N-D shift control valve 280 and an oil path 124, and are also connected together through the impulse suppressing valve 260, oil paths 111, 112, the N-D shift control valve 280 and the oil path 124. The hydraulic oil from the oil path 104 is supplied to the clutch 24 by a procedure as mentioned below. The hydraulic oil which is controlled in accordance with the pattern of oil pressure shown in FIG. 4 by means of the impulse suppressing valve 260 is fed through oil paths 111 and 112, the oil chamber 283 of the N-D shift control valve 280 and the oil path 124 to the clutch 24, thus allowing a smooth engagement of the clutch 24 in a manner to prevent any impulses from being occurring as a result of a shift operation. In the meantime, the actuating oil chamber 285 of the N-D shift control valve which is connected to the oil path 104 through the oil path 124 and the orifice 284 has its pressure gradually increased, moving the spool 282 to the left, thus interrupting the communication between the oil paths 112 and 124 and providing a communication between the oil paths 104A and 124 in synchronism with the completion of the engagement of the clutch 24. In this manner, the line pressure is supplied to the clutch 24, and is maintained as long as the manual valve 210 remains in its D-position.

During the 1-2 shift operation, the solenoid valve 300 is opened and closed with a given period for an interval on the order of 2 seconds, for example, producing a change of oil pressure in the oil chamber 263 as shown in FIG. 4. The hydraulic oil which has its pressure controlled by the first pressure controlling chamber 264 in accordance with the pressure change is fed through the oil paths 111 and 114, the flow control valve 340 and through the oil paths 115 and 116 to cause a smooth engagement of the brake 26. As the brake 26 is engaged, the accumulator 360 connected with the oil path 116 has its spool 362 driven to the right, as viewed in FIG. 2, by the resilience of the spring 361 and by the oil pressure within the oil path 116.

During the 2-3 shift operation, the solenoid valve 310 is initially deenergized to cause a movement of the spool 232 of the 2-3 shift valve to the right, whereby the oil path 111 communicates with the oil path 119 while the oil path 114 communicates with an oil drain port 211 through the oil path 107. The 2-3 shift represents a shift operation from a braked to a clutched condition which does not utilizes one way clutch, and hence requires that the brake 26 be maintained engaged for a given time interval. Consequently, the release of the brake 26 takes place by maintaining it engaged for an optimum interval by means of the flow control valve 340 and the accumulator 360, subsequently energizing the solenoid valve 320 to cause the spool 222 of the 1-2 shift valve to move to the right, causing the oil path 116 to communicate with an oil drain port 224.

During 2-3 shift operation, the 2-3 shift control valve 240 assumes its leftmost position as a result of the line pressure of the oil path 102 being supplied to its oil chamber 243 while the oil path 119 communicates with the oil path 120 to cause an engagement of the clutch 25. The oil path 102 also communicates with the oil paths 113, 117 to fix the spool 252 of the 3-4 shift valve to its leftmost position while acting through the oil path 118 to cause an engagement of the clutch 12. When the 2–3 shift operation is completed, the controlled pressure rises to the line pressure whereupon the oil pressure of the clutch 25 and the resilience of the spring 241 cause the spool 242 to move to the right. In response thereto, the oil pressure from the oil path 122 is fed to the oil chamber 244, whereby the spool 242 is fixed to its rightmost position while a communication is provided between the oil paths 119 and 117 and between oil paths 113 and 103. During 3–4 shift operation, the solenoid valve 320 remains deenergized, so that the spool 252 of the 3–4 shift valve 250 moves to the right, causing the oil path 118 to communicate with an oil drain port 255, thus releasing the clutch 12. On the other hand, the oil pressure which is controlled by the first pressure controlling chamber 264 is fed from the oil path 123 through the oil paths 117 and 119 to the brake 19, causing a smooth engagement thereof. The 4–3 shift operation takes place by an opposite procedure. During 3–2 shift operation, the solenoid valve 320 is deenergized while the solenoid valve 310 is energized to cause a down shift to the second speed stage, causing a synchronization of rotation of the engine and the transmission while controlling the oil pressure by means of the impulse suppressing valve 260. The 2–1 shift operation takes place by an opposite procedure of the 1–2 shift operation. When the manual valve 210 has three positions, the line pressure is supplied to the oil chamber 253 through the oil paths 103 and 113, whereby the spool 252 of the 3–4 shift valve 250 is fixed to its leftmost position, preventing a shifting to the fourth speed stage. In the L-position, the hydraulic oil is supplied from the oil path 105 to the oil chamber 234 of the 2–3 shift valve, whereby the spool 232 is fixed to its leftmost position, preventing a shifting to the second, third or fourth speed stage. In the R-position of the manual valve 210, no hydraulic oil is supplied to the oil path 104, so that no oil pressure is supplied to the oil paths 108, 109 which communicate with the solenoid valves 310, 320 while an oil pressure is supplied to the oil path 105, whereby the 2–3 shift valve assumes its leftmost position. The oil pressure supplied to the oil path 107 is thence fed to the oil path 122 on one hand and is also fed through the flow control valve 330 and the oil path 121 to be controlled in pressure by the second pressure controlling chamber 265 of the impulse suppressing valve 260 to be subsequently applied through the oil path 121 to the first piston of the clutch 25 and applied through the oil paths 119 and 120 to the second piston of the clutch 25, thus causing a smooth engagement of the clutch 25. A communication is established directly between the oil paths 102 and 106, causing an engagement of the brake 27 before the clutch 25 is engaged.

Figure 3:
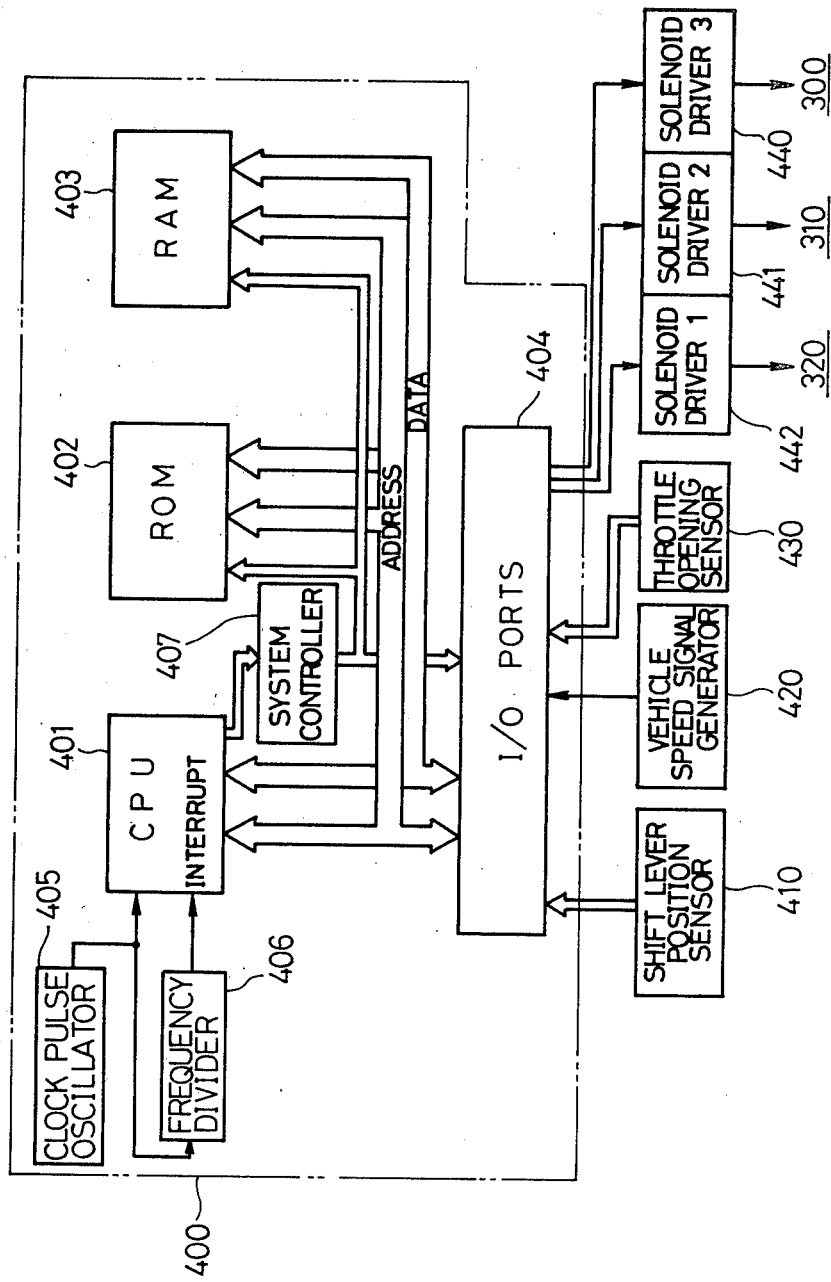
FIG. 3 is a block diagram of one embodiment of the invention.
Figure 5:
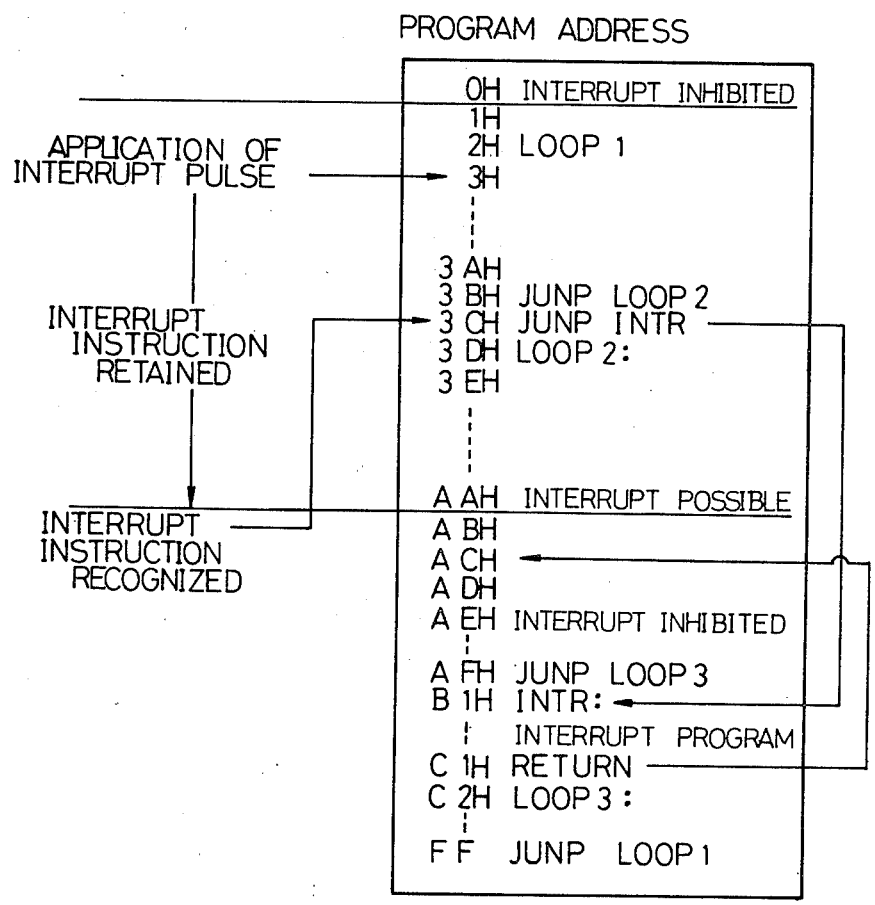
FIG. 5 is a program chart illustrating an interrupt operation of the embodiment shown in FIG. 3.

FIG. 3 schematically illustrates the overall arrangement of an electronic digital control system 400 which controls the opening and closing of the solenoid valves 300, 310 and 320. The control system 400 includes a large scale integrated semiconductor logic unit having the capability pf a high level digital arithmetic operation, commonly referred to as a central processing unit or a microprocessor (hereafter referred to as CPU) as its essential component. Additionally, the control system includes a read-only memory 402 (hereafter referred to as ROM) in which programs controlling the logical operation of the logic unit as well as a variety of data are fixedly stored, a read-write memory (hereafter referred to as RAM) 403 for storing or reading the date read from ROM 402 or temporary input and output data, and input/output ports 404, a clock pulse oscillator 405, a frequency divider 406 and a system controller 407 which specifies a particular location within the read-write memory. It will be noted that CPU 401, ROM 402 and RAM 403 are interconnected by address bus, data bus and clock pulse bus. A basic clock is produced by the oscillator 405 and is applied to basic clock input terminals of the units 401 to 403 and 406. The frequency divider 406 performs a frequency division of the basic clock for application of its output to an interrupt terminal of CPU 401. In the embodiment shown, an interrupt operation takes place with the period of an output pulse from the frequency divider 406 in order to detect a change in the running condition of a vehicle from a flat road to a slope or vice versa and to constrain a switching of the running range or to perform such switching in a corresponding manner. Referring to FIG. 5 for describing the summary of an interrupt operation within CPU 401, the programs contained in ROM 402 are advanced one address by another by a program counter. An interrupt function refers to a forced transfer of an address contained in the program counter to a specified address (which is address 3CH in FIG. 5) in response to the application of the pulse to the interrupt terminal of the CPU 401. An interrupt instruction which causes the interrupt function to be performed is maintained in CPU 401, which prevents an interrupt instruction from being executed at a program address where the execution will result in an error. An interrupt instruction will be retained until an address ABH is reached where an interruptable program is stored and where the interrupt is recognized, changing the code of the program counter to a specified interrupt address (which is address 3CH in FIG. 5). When the program at such address is executed, the sequence is returned to the address ACH which is next to the particular address where the interrupt instruction has been recognized.

In addition to storing the program which is used to detect an interrupt and to execute it, ROM 402 also stores a number of program data as well as reference data which are utilized in the determination or detection by these programs, including a program for determining the speed range when running on a flat road and associated reference data; a program for changing the speed range; a program for detecting a running on a slope and associated reference data; a program to constrain the switching of the speed range; a program to terminate the constraint; a program to control the pressure by the solenoid valves; and a program to prevent the occurrence of drive train noises. The execution of these programs principally depends on the shift lever position (L, 2, 3, D, R or the like), the vehicle speed (the rotational speed of the output shaft of the automatic, variable speed transmission) and the throttle opening. The execution of these programs results in the solenoid valves 300, 310 and 320 being opened or closed.

At this end, a shift lever position sensor 410, a vehicle speed signal generator 420, a throttle opening sensor 430 and a plurality of solenoid drivers 440, 441 and 442 are connected to the input/output ports 404.

In the subsequent description of FIG. 3 and succeeding Figures, the input/output ports 404 and the frequency divider 406 are treated as separate from ROM 402 and RAM 403, but it should be understood that there are ROM and RAM having such input/output ports contained on the single chip or RAM having the frequency divider and the input/output ports disposed on the single chip. Therefore, it should be understood that the illustration in the drawings and the description to follow comply with one denotation scheme and that there is no need to utilize the discrete units and elements as shown.

Figure 6A:
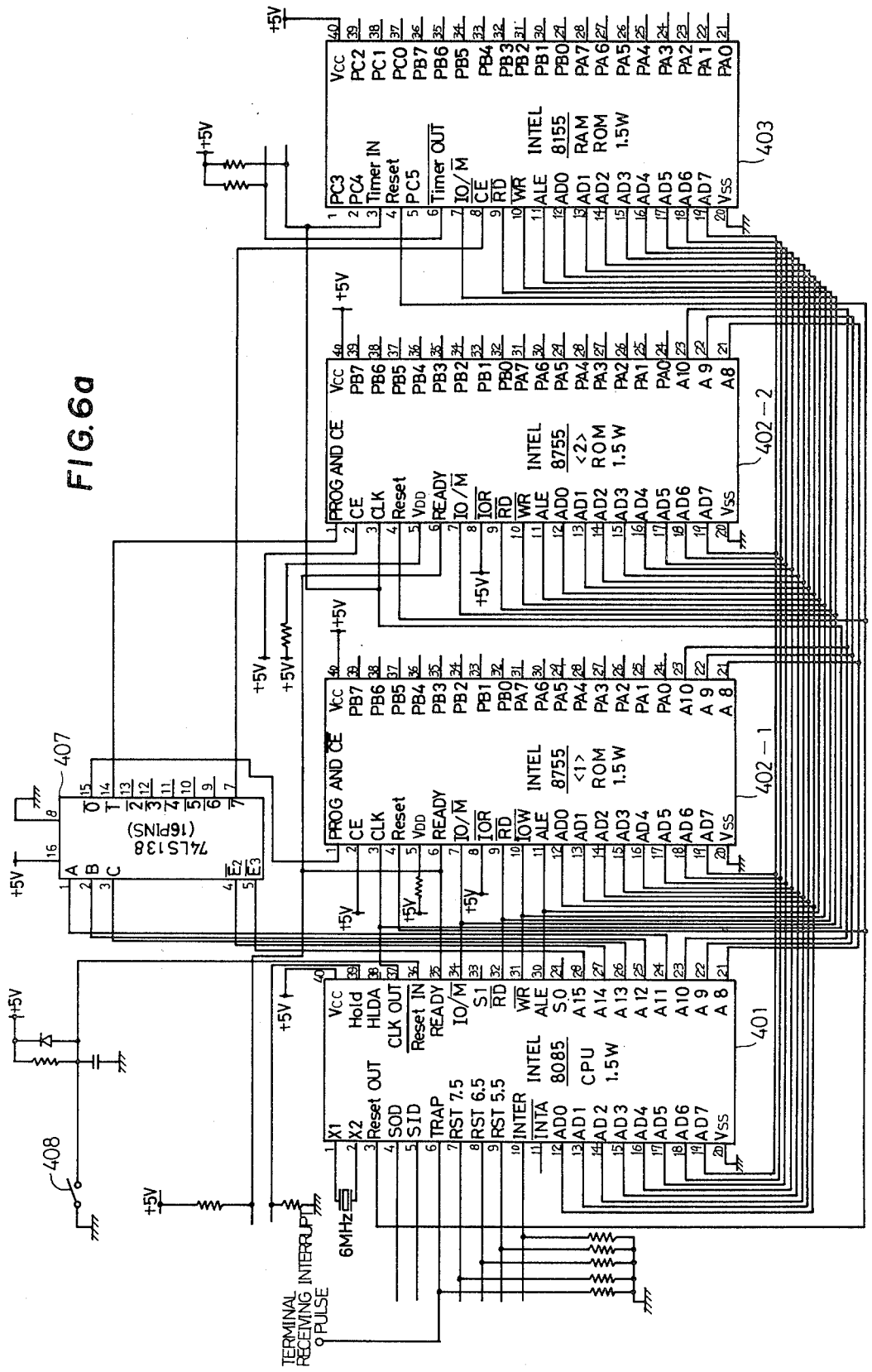
FIG. 6a is a detailed block diagram of a part of the embodiment shown in FIG. 3.
Figure 6B:
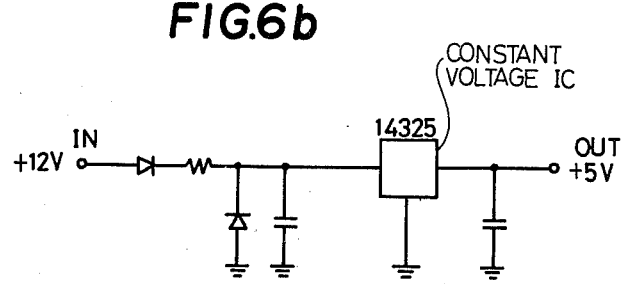
FIG. 6b is a circuit diagram of a power supply circuit.

FIG. 6a shows one specific embodiment of the essential part thereof. In the embodiment shown, ROM 402 comprises a pair of chips 402-1 and 402-2, with a constant voltage of +5 V applied to various parts thereof. When a switch 407 is closed, a control operation is initiated with the leading one (START) of programs contained in ROM 402-1, 402-2, repeatedly performing various operations to be described later in accordance with the programs contained therein. The constant voltage of +5 V is supplied by a constant voltage circuit shown in FIG. 6b. The vehicle speed signal generator 420 comprises an induction coil 421 which cooperates with a permanent magnet connected to the output shaft of the transmission to detect a rotation thereof, and an associated pulse shaper 422, as indicated in FIG. 6c. The pulse shaper 422 produces pulses of a frequency which is proportional to the number of revolutions of the output shaft. These output pulses are fed to a count pulse input terminal CLK of a counter COU, the count of which is stored by a latch LUT. The counting operation and the latching operation continue so long as pulses of a given period are applied to the frequency divider FDE from the output terminal Timer OUT of RAM 403. Thus, the output code of the latch LUT represents a vehicle speed, which is applied to input ports PA0-PA7 of ROM 402-1.

Figure 6D:
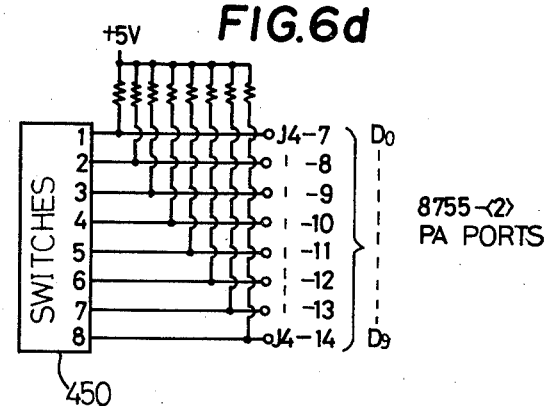
FIG. 6d is a circuit diagram of a circuit which determines the time limits of a timer program.
Figure 6E:
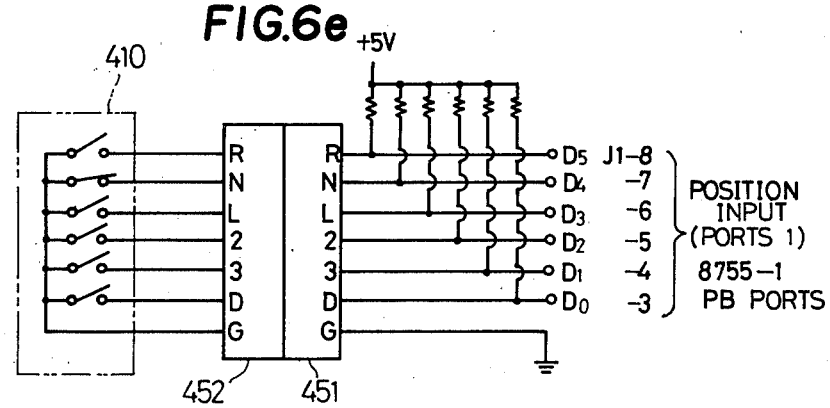
FIG. 6e is a circuit diagram of a shift lever position sensor.
Figure 6F:
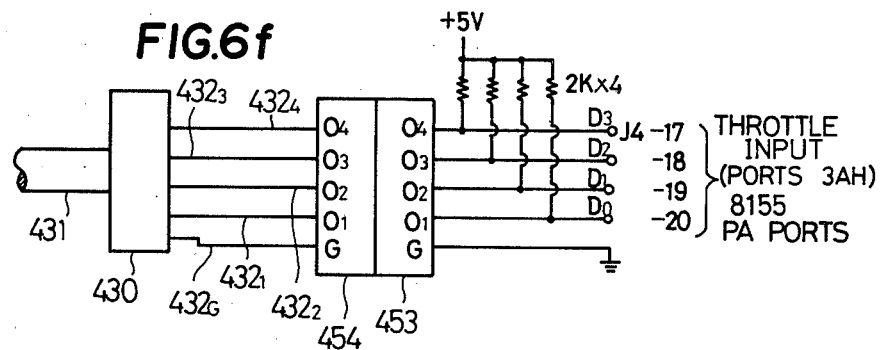
FIG. 6f is a circuit diagram showing the connection of a throttle opening sensor.
Figure 6G:
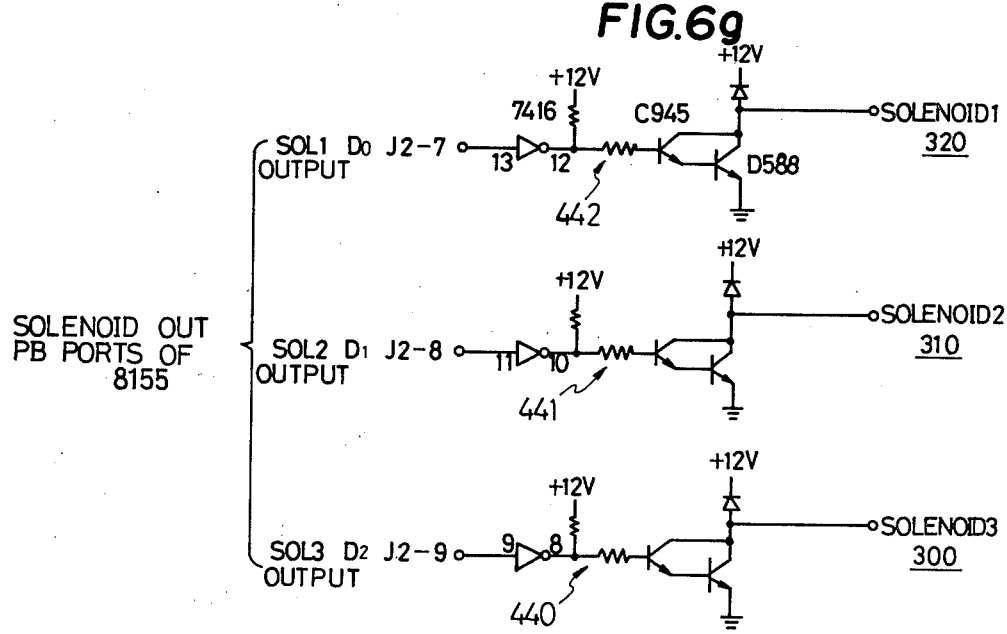
FIG. 6g is a circuit diagram of solenoid drivers.

A switch 450 (shown in FIG. 6d) which defines the time limit of a timer is connected to terminals PA0-PA7 of ROM 402-2 while switches of the shift lever position sensor 410 are connected to terminals PB0-PB7 of ROM 402-1 through connectors 451, 452 as shown in FIG. 6e. The throttle opening sensor 430 is connected to ports PA0-PA7 of RAM 403 through connectors 453, 454 as shown in FIG. 6f. Similarly, the solenoid drivers 440-442 as shown in FIG. 6g are connected to ports PB0-7 of RAM 403.

Figure 7C:
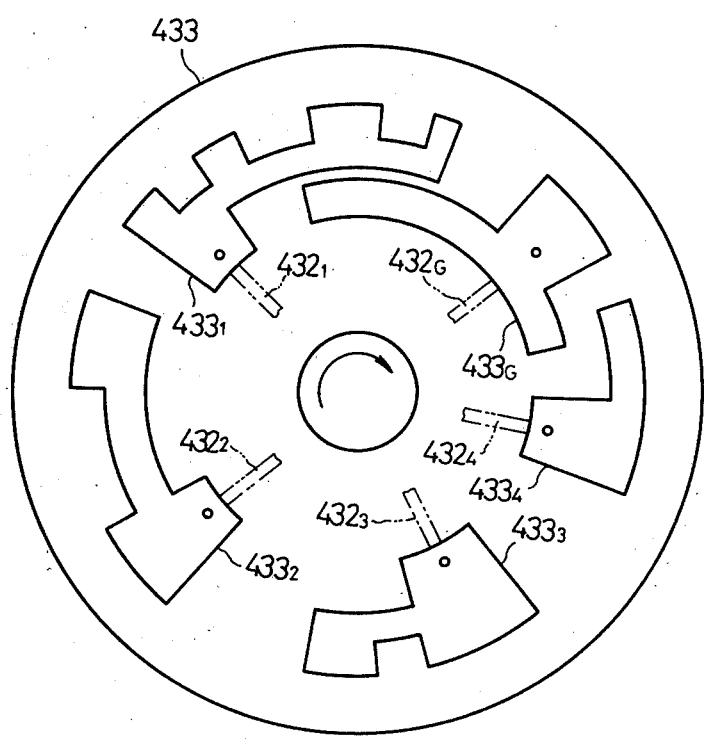
FIG. 7c is an enlarged plan view of a printed circuit substrate.

The throttle opening sensor 430 includes a shaft 431 which is connected to the rotating shaft of the throttle valve for rotation therewith, a plurality of rotary contacts fixedly carried by the shaft, and a plurality of fixed contacts which are equal in number to the number of rotary contacts. It represents a digital code generator of potentiometer type. A plan view of the sensor 430 as viewed from the side thereof where lead wires are taken out is shown in FIG. 7a while a cross section thereof taken along the line VIIB—VIIB is shown in FIG. 7b. The digital code generator 430 is designed to produce a 4 bit code so as to indicate 16 steps of throttle openings 0-15. Four output leads $432_1$-$432_4$ which transmit the first to the fourth digit, respectively, as well as a single ground connection lead $432_G$ are connected to split electrodes printed on a disc-shaped printed circuit substrate 433, which is shown in an enlarged plan view in FIG. 7c. As shown, the substrate 433 is formed with split electrodes $433_1$-$433_4$ on which the first to the fourth digit of the binary output appear, as well as a split electrode $433_G$ which is connected with the ground potential. The four split electrodes $433_1$-$433_4$ are disposed in different 90°-sectors of the substrate 433. The substrate 433 is fixedly mounted on a housing base 434. A slider 435 formed of a resilient material is fixedly mounted on the shaft 431, and is shown in plan view in FIG. 7d. As shown, the slider 435 is formed with four arms $435_1$-$435_4$ which are angularly spaced apart by 90°. Another arm $435_G$ is formed between the arms $435_1$ and $435_4$. The free end of these individual arms fixedly carry contact members $436_1$-$436_4$ and $436_G$, which are aligned with and engage the uneven, outermost portions of the split electrodes $433_1$-$433_4$ and an arcuate, innermost portion of the split electrode $433_G$, respectively, when the substrate 433 is mounted on the housing and the shaft 431 is mounted therein. Specifically, as the shaft 431 moves angularly over an extent of 90°, the contact member $436_G$ is maintained in engagement with the split electrode $433_G$ while the contact members $436_1$-$436_4$ move into or out of engagement with the corresponding split electrodes, depending on the outermost pattern of the respective electrodes. More specifically, considering the split electrode $433_1$, it assumes a ground potential when it is in engagement with the contact member $436_1$, whereby the lead $432_1$ which is connected therewith through a plating of a through-hole and an associated rear electrode also assumes a ground potential. However, when it is not engaged by the contract member $436_1$, the lead $432_1$ as well as the split electrode $433_1$ assume a level of +5 V because such potential is applied to the lead $432_1$ through connectors 453 and 454 as shown in FIG. 6f. In this manner, individual split electrodes $433_1$-$433_4$ are patterned to assume either a ground level or +5 V level depending on the angular position of the shaft 431 and hence the slider 435. In the present embodiment, the angular extent of 90° for rotation of the shaft 431 is divided into 16 segments, to provide 16 steps of the throttle opening. More specifically, the patterns of the respective split electrodes $433_1$-$433_4$ are chosen so as to provide a Gray code shown in FIG. 7e by four bit outputs $\theta_1$-$\theta_4$ on the leads $432_1$-$432_4$ corresponding to the throttle opening 0-15. In this code, "0" represents a ground level and "1" +5 V level. The purpose of choosing such pattern to provide a Gray code is to assure that a throttle opening which is represented by the outputs $\theta_1$-$\theta_4$ has no significant difference over the actual opening even if the contact members $436_1$-$436_4$ become momentarily or temporarily disengaged from the split electrodes $433_1$-$433_4$, respectively. By way of example, when the throttle opening changes from 3 (0010) to 4 (0110), in the transient condition until the contact member $436_3$ engages the split electrode $433_3$, the code indicative of the throttle opening remains to be 0010 so as to represent an opening 3, preventing an opening which significantly deviates from a value around the opening 4 to be indicated. If a normal binary denotation is employed, the opening 3 will be represented as 0011 and the opening 4 as 0100. When changing from 0011 to 0100, there will be produced those openings such as 0111 (opening 7), 0101 (opening 5), 0000 (opening 0), or 0001 (opening 1) which significantly deviate from either opening 3 or 4. However, with the throttle opening sensor 430, no such code will be produced which exhibits a significant deviation.

Figure 8A:
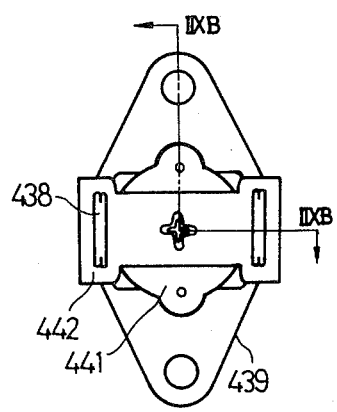
FIG. 8a is a front view of one of the solenoid valves shown in FIG. 2.
Figure 8B:
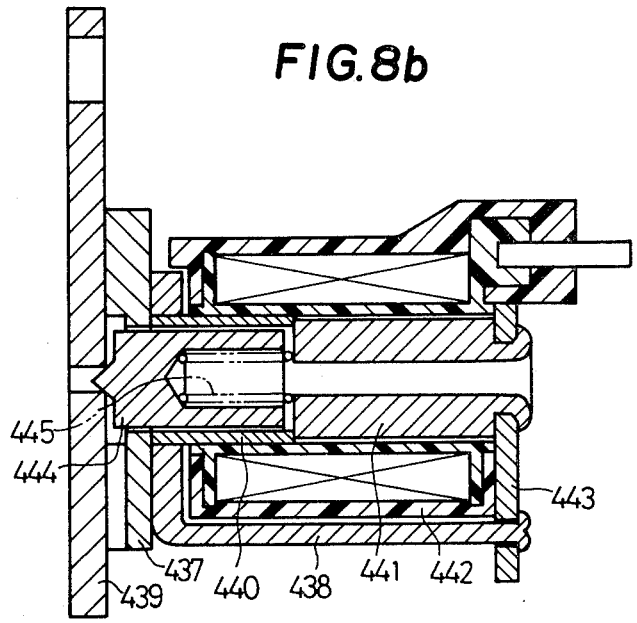

FIG. 8a shows a rear view of one of the solenoid valves 300, 310 and 320 which have an identical construction. A cross section thereof taken along the line IIXB—IIXB is shown in FIG. 8b. The solenoid valve comprises a valve plate 437 and a carrier 438 which are joined together by a spot welding, with an orifice plate 439 joined to the valve plate 437 by a projection welding. A sleeve 440 is inserted into an opening formed in the carrier 438 and its front end is disposed in abutment against the valve plate 437. Subsequently, the front end of a core 441 is forced against the rear end of the sleeve 440 to mount a coil case 442. Finally the rear end of the carrier 438 and the core 441 is caulked to a back plate 443. The solenoid valve includes a plunger 444 and a compression spring 445. In this solenoid valve, the sum of the thickness of the valve plate 437 and the length of the sleeve 440 determines a spacing between the orifice plate 439 and plunger 441 or a stroke through which the latter operates. The accuracy of such stroke depends only on the precision of the thickness of the valve plate 437 and the length of the sleeve 440, and any error in the length of the plunger 441 or the thickness of the back plate 443 has no influence whatsoever upon the stroke of the plunger 444.

Figure 9A:
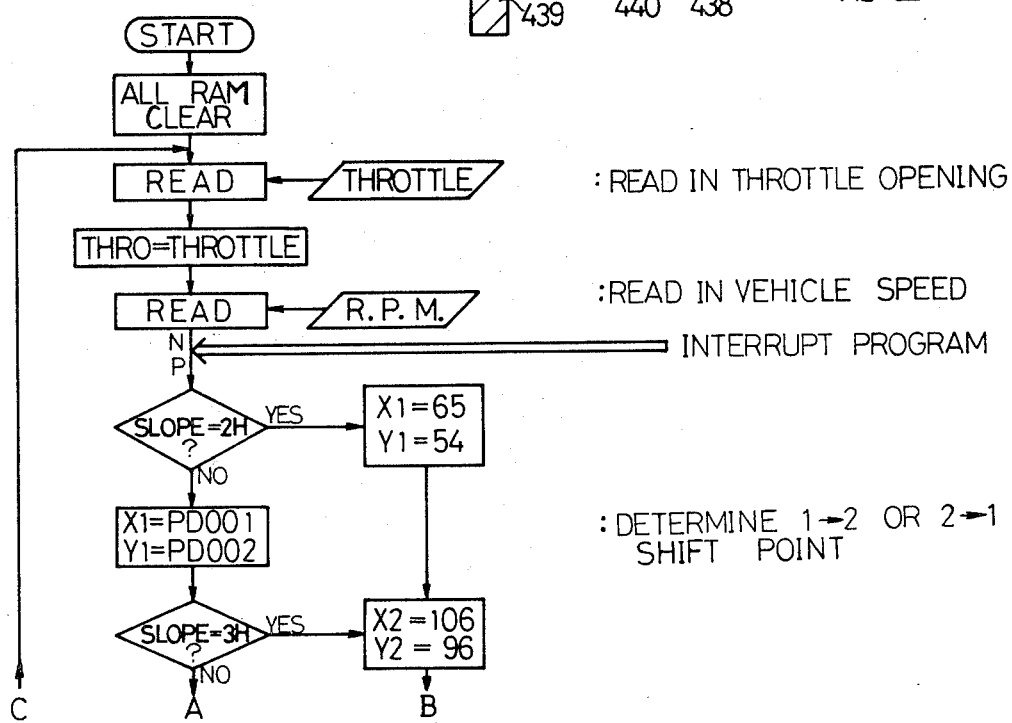
Figure 9B:
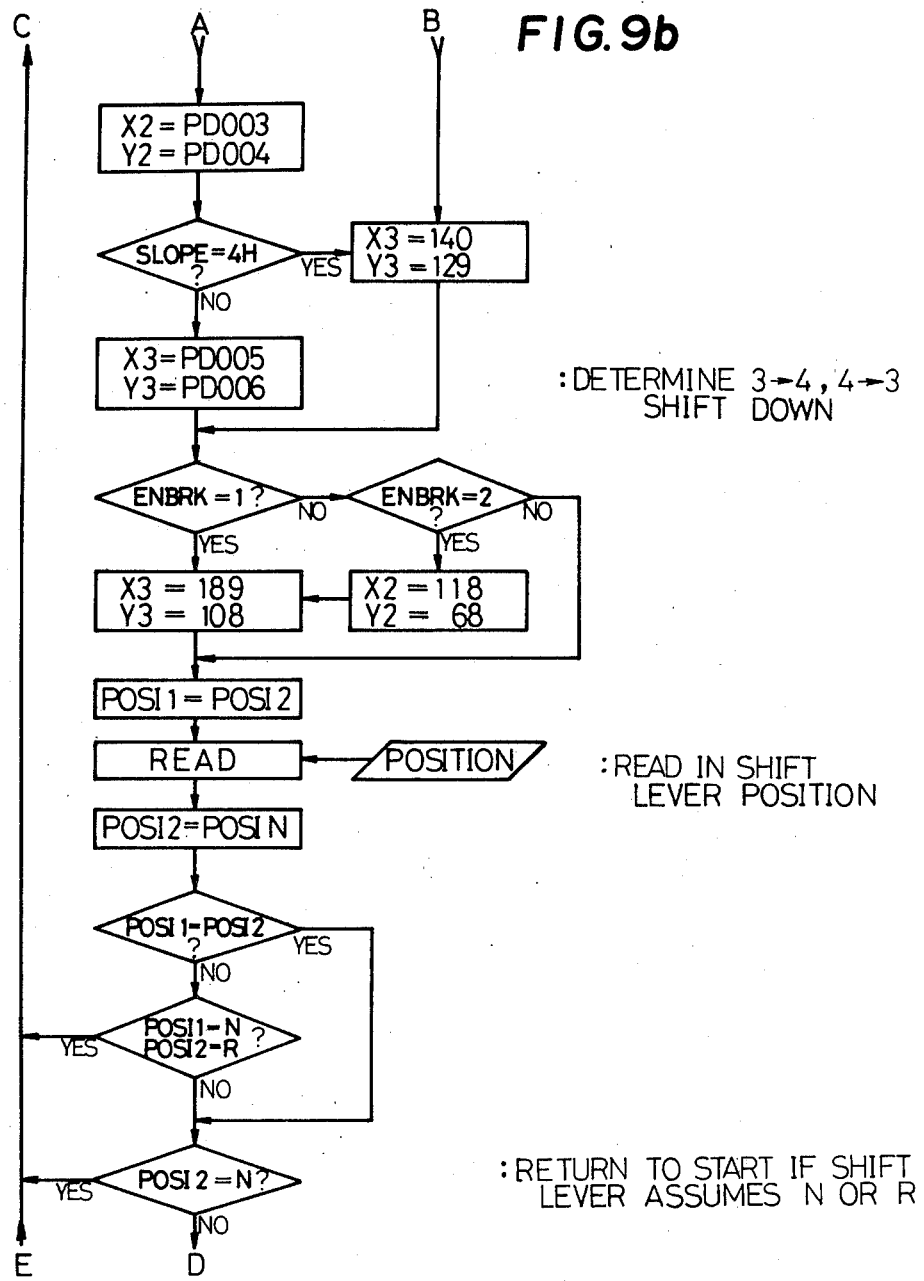
Figure 9D:
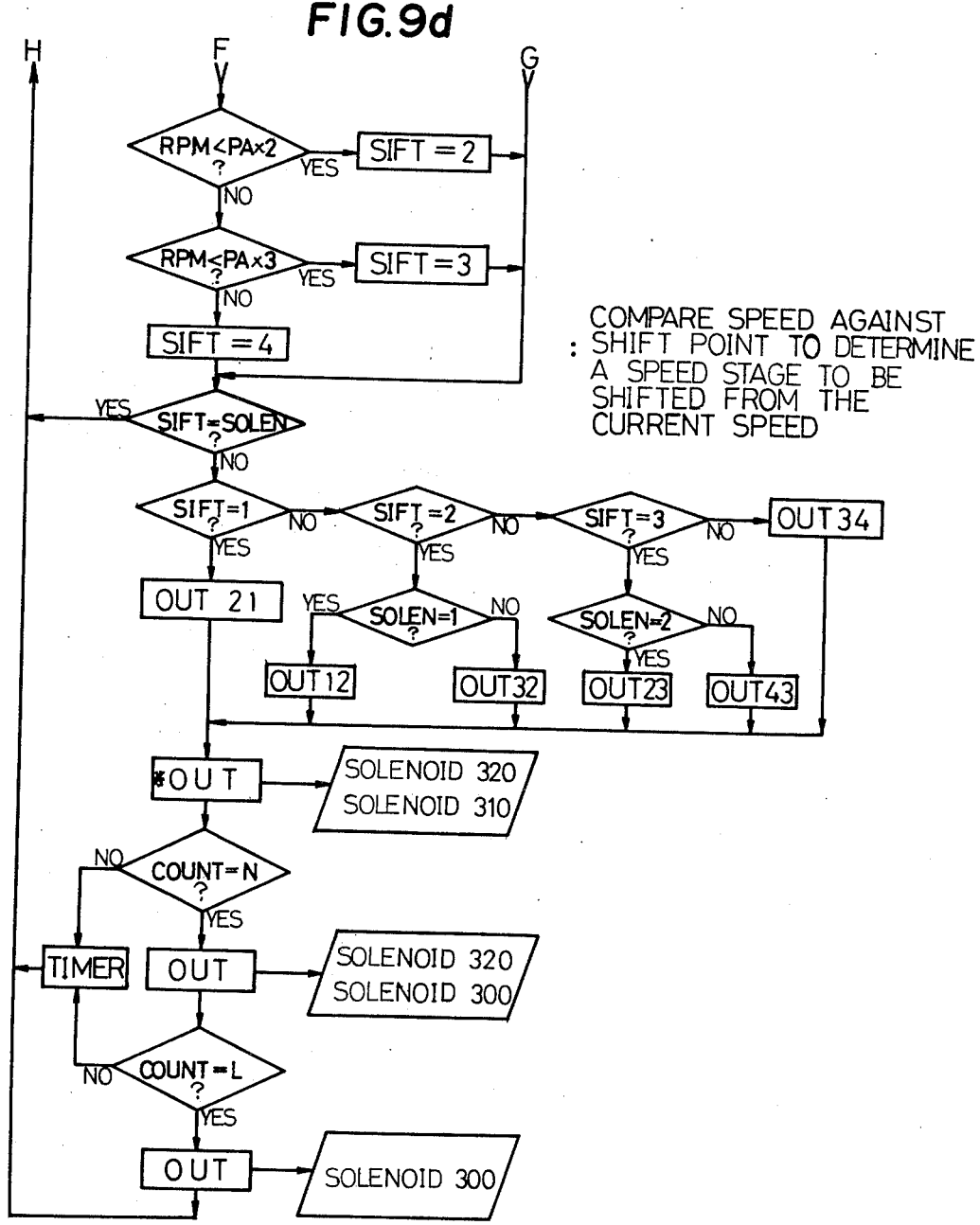
Figure 11D:
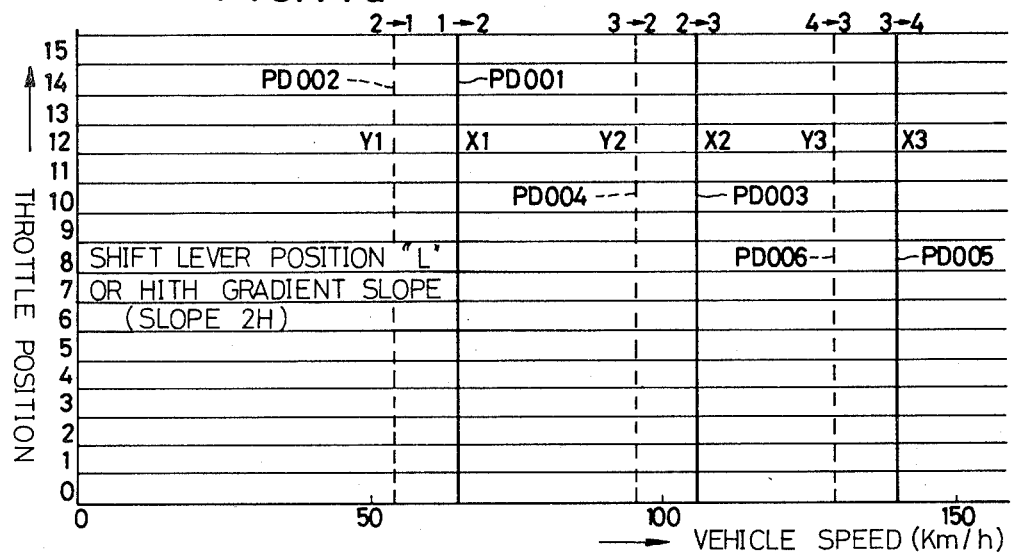

FIGS. 9a to 9k show the flow charts of the principal programs which are fixedly stored in ROM 402-1 and 402-2. Referring to these flow charts, the operation of the electronic digital control system 400 shown in FIG. 3 will be described. A program starts with a momentary closure of the switch 408 (FIG. 9a), clearing the entire content of RAM 403, into which a throttle opening ($\theta_1-\theta_4$) is then written at an address designated by THRO. A vehicle speed (an output code from the latch LUT shown in FIG. 6c) is then written into RAM at an address RPM. An interrupt operation then takes place in order to detect any slope on which the vehicle is running or a change from a slope to a flat road. Specifically, the detection occurs after the vehicle speed has been read and written into RAM 403. Although the detail of this interrupt operation to detect a slope will be described in more detail later, it can be briefly described as the program in which a determination is made on the basis of the throttle opening THRO, the vehicle speed RPM and their accelerations whether the vehicle is running on a slope or a flat road or what is the inclination or gradient of the slope, and wherein a down shift instruction is produced if the gradient is high and the current speed range cannot provide an appropriate gear ratio, preventing an up shift until a termination instruction is produced, while a reduction in the inclination of the slope is also detected, outputting an instruction which releases a down shift or terminate the constraint against an up shift. PD001–PD006 represent shift reference patterns which are utilized in order to determine 1→2 shift, 2→1 shift, 2→3 shift, 3→2 shift, 3→4 shift and 4→3 shift, respectively. X1, Y1, X2, Y2 and X3, Yx represent shift points (vehicle speed) where the shift takes place and which are determined by the throttle opening THRO ($\theta_1-\theta_4$) in the shift reference patterns. The shift reference patterns PD001–PD006 are shown in FIGS. 11a to 11d in terms of the vehicle speeds as a function of the throttle opening. The shift reference patterns are stored in ROM 402-1, 402-2 as reference data, the vehicle speeds representing data to be stored and the throttle opening from 0 to 15 being used as an address. It will be noted that X1–X3 and Y1–Y3 represent the vehicle speeds in the respective shift reference patterns which correspond to the particular throttle openings. The pattern shown in FIG. 11a represents a reference pattern which is used to switch a speed range when the vehicle is running on the flat road and the shift lever is in its D-position. When the vehicle is running on a slope, the pattern is modified in accordance with the inclination of the slope to provide a reference data which is used to switch the speed range, modifying the original pattern into a pattern which constrains 3→4, 2→3 and 1→2 shifts when the shift lever is in its 3-, 2- and 1-position, respectively. Thus, FIG. 11a represents a standard pattern. A modification of the pattern takes place when a standard pattern is written into RAM 403 from ROM 402-1, 402-2, based on the position POSi of the shift lever and the inclination of the slope (SLOPE2H, SLOPE3H and SLOPE4H) detected in the interrupt program. Specifically, a reference data for switching a speed stage is produced by rewriting PD005 for the 3-position of the shift lever as shown in FIG. 11b, and rewriting PD005 and PD006 for the 3-position of the shift lever and a low gradient slope 4H as shown in FIG. 11b, both to a given vehicle speed or speeds which are independent from the throttle opening THRO, namely, to a maximum vehicle speed (140 km/h) which is available on the third gear of the vehicle which corresponds to the maximum rotational speed of the engine, at the time when the standard pattern is written into RAM 403. In a similar manner, for the shift lever position "2" and medium gradient slope 3H, PD002–PD006 are rewritten as maximum vehicle speeds which are available on the second and the third gear and which are independent from the throttle opening THRO, as shown in FIG. 11c. For the shift lever position "L" and a high gradient slope 2H, all of the patterns PD001–PD006 are rewritten as maximum vehicle speeds corresponding to the respective speed stages and which are independent from the throttle opening THRO, as indicated in FIG. 11d. Switching of the speed stage with reference to the patterns PD001–PD006 of these various modes takes place in the manner mentioned below. Specifically, a slope is detected by executing an interrupt program which takes place periodically in response to an output pulse from the frequency divider 406 (FIG. 3), and one of the modes shown in FIGS. 11a to 11d is selected. Assuming that the vehicle is running on a flat road and the shift lever is in its D-position, the patterns PD001–PD006 shown in FIG. 11a are specified, and reference is made to the current speed stage SR and a throttle opening $\theta$. If $\theta=9$, and SR=2, for example, the values of the vehicle speed $Y1\approx15$ and $X2=70$ for $\theta=9$ are read from patterns PD002 and PD003 which represent the boundaries between adjacent speed stages, and are compared against the actual vehicle speed AS. If AS<15 =Y1, a 2→1 shift command is produced. If AS≧70=X2, a 2→3 shift command is produced. If 15<AS<70, no shift command is produced in order to maintain the current status. For other positions of the shift lever and slopes of different gradients 4H–2H, two values of the vehicle speed (corresponding to the boundary on the lower and higher speed side) are read from the patterns PD001–PD006 of a corresponding mode (FIGS. 11b to 11d) on the basis of the current speed stage, and are compared against the current value of the vehicle speed. While a switching to any speed stage takes place automatically for the shift lever position "D" and when the vehicle is running on a flat road, it is to be noted that for the 3-, 2- and L-positions of the shift lever or when the vehicle is running on a slope, the reference pattern data on the higher speed side, namely, the data against which the vehicle speed is to be compared, is predetermined to a value of the vehicle speed which corresponds to the maximum rotation of the engine in the respective speed stages. Consequently, if a driver effects acceleration while maintaining the shift lever in its 3-position, for example, a shift operation takes place when the maximum vehicle speed on the third gear is reached in order to prevent an overrun of the engine. Down shift patterns PD002, PD004 and PD006 are also shifted to enable a suitable engine braking operation. By fixing the up shift patterns and the down shift patterns which represent reference data to a high value of the vehicle speed which is independent from the opening of the throttle valve, a hunting which results from a temporary shifting operation is avoided when running on a slope. The flow charts shown in the lower half of FIG. 9a, FIG. 9b, FIG. 9c and in the upper one-third of FIG. 9d represent the selection of the speed stage described above. More specifically considering the selection of a speed stage, it will be noted in FIG. 11d that for SLOPE=2H, the patterns PD001-PD006 are chosen so that the vehicle will run in first gear since a suitable gear ratio will not be obtained when the vehicle is running on a slope in second gear. Consequently, the 1→2 shift point X1 and the 2→1 shift point Y1 are fixed to the higher speed side (X1=65 km/h and Y1=54 km/h in the example shown in FIG. 11d). In order to prevent the 1→3 and 1→4 shift, other shift points (X2, Y2, X3, Y3) are fixed to the higher speed than the 1→2 shift point (X2=106 km/h, Y2=96 km/h, X3=140 km/h and Y3=129 km/h in the example shown in FIG. 11d). For SLOPE=3H, the patterns are chosen so that the vehicle will run in second or first gear since an appropriate gear ratio will not be obtained if the vehicle runs on a slope in third gear. Accordingly, the shift patterns PD001 and PD002 for the flat road are used for the 1→2 shift and 2→1 shift. The 2→3 shift point X2 and the 3→2 shift point Y2 are fixed to the higher speed X2=106 km/h and Y2=96 km/h in the example shown in FIG. 11c). In the same manner as for SLOPE=2H, the 3→4 shift point X3 and the 4→3 shift point Y3 are fixed to the higher speed than X2 and Y2. For SLOPE=4H, the patterns are chosen so that the vehicle will run in third, second or first gear since a suitable gear ratio will not be obtained if the vehicle runs in fourth gear. Hence, for 1→2, 2→1, 2→3 and 3→2 shifts, the shift patterns PD001, PD002, PD003 and PD004 for the flat road are used while fixing 3→4 shift point X3 and 4→3 shift point Y3 to the higher speed side (X3=140 km/h and Y3=129 km/h in the example shown in FIG. 11b). The shift lever position which is read by the shift lever position sensor is stored at an address POSi 2 while the value of POSi 2 which was stored previously is stored at an address POSi 1 as a previous shift lever position. In the present example of flow charts, the program will return to the start for the shift lever positions "N" and "R". However, it will be apparent that a necessary control of the solenoids 300, 310 and 320 can be made before returning to the start of the program. The speed stage which was stored previously is stored at an address SOLEN, SOLEN=1, 2, 3, 4 corresponding to first, second, third and fourth gears or speed stages. In the present embodiment, there are four speed stages from the first to the fourth, so that there are three shift points where the comparison takes place. By way of example, when the current speed stage (namely, SOLEN) is the first gear, 1→2, 1→3 and 1→4 shifts will be possible provided the actual shift operation is neglected. When the current speed stage is the second gear, 2→1, 2→3 and 2→4 will be possible while when the current speed stage is the third gear, 3→4, 3→2 and 3→1 shifts will be possible. Finally, when the current speed stage is the fourth gear, 4→3, 4→2 and 4→1 shifts will be possible. In this manner, it is possible to provide three shift points for the current speed stage (SOLEN), which are PAX1, PAX2, PAX3. In other words, of six available shift points (1→2: X1, 2→1: Y1, 2→3: X2, 3→2: Y2, 3→4: X3, 4→3: Y3), three necessary shift points (PAX1, PAX2, PAX3) can be determined for the current speed stage (SOLEN), as indicated in the Table III below.

TABLE III

| Address | Current Speed Stage | | | |
|---|---|---|---|---|
| | 1st | 2nd | 3rd | 4th |
| PAX1 | X1 | Y1 | Y1 | Y1 |
| PAX2 | X2 | X2 | Y2 | Y2 |
| PAX3 | X3 | X3 | X3 | Y3 |

A change of the shift point depending on the position of the shift lever will be fixed as illustrated in FIGS. 11a and 11b (D-range and 3-range are exemplified in these Figures, respectively). When the shift lever is in its D-position, no change is made. For the 3-range, the 3→4 shift is prevented by fixing PAX3 (3→4 shift point) to a higher speed (223 km/h, for example). For 2-range, the 2→3 and 3→4 shifts are prevented by fixing PAX2 (2→3 shift point) and PAX3 (3→4 shift point) to higher speeds, as illustrated in FIG. 11c. For the L-range, 1→2, 2→3 and 3→4 shifts are prevented by fixing PAX1 (1→2 shift point), PAX2 (2→3 shift point) and PAX3 (3→4 shift point) to higher speeds, as shown in FIG. 11d. The vehicle speed (RPM) is then compared against the three shift points in order to determine a speed stage (SiFT) in accordance with the prevailing vehicle speed. Stated differently, SiFT represents a speed stage which is determined in accordance with the vehicle speed (RPM), the position of the shift lever (POSi2) and the status of the road (SLOPE). Thus, SOLEN represents a current speed stage while SiFT represents a speed stage to which a shift should be made. The combination of SOLEN and SiFT determines a particular mode of shift to be made (1→2, 2→1, 2→3, 3→2, 3→4, 4→3). When a particular shift mode is determined, an output is produced to activate the solenoids 300, 310 and 320 as indicated in FIG. 4 (and also indicated by portions of the flow chart shown in the middle and 1st part of FIG. 9d). A pressure controlling action by the solenoid 300 takes place by duty control to achieve a necessary pressure controlling characteristic. Time intervals such as a time shift in the energization of the solenoids 310 and 320 in the 2→3 shift, a given length of duration during which the solenoid 300 is maintained on in the 4→3 shift, required for a duty control of the solenoid 300 in the 1→2 shift, all shown in FIG. 4, as well as all other necessary time periods are derived by a counting operation of a timer which is prepared within the program on the basis of the unit time of, for example, 0.05 sec.

Figure 12A:
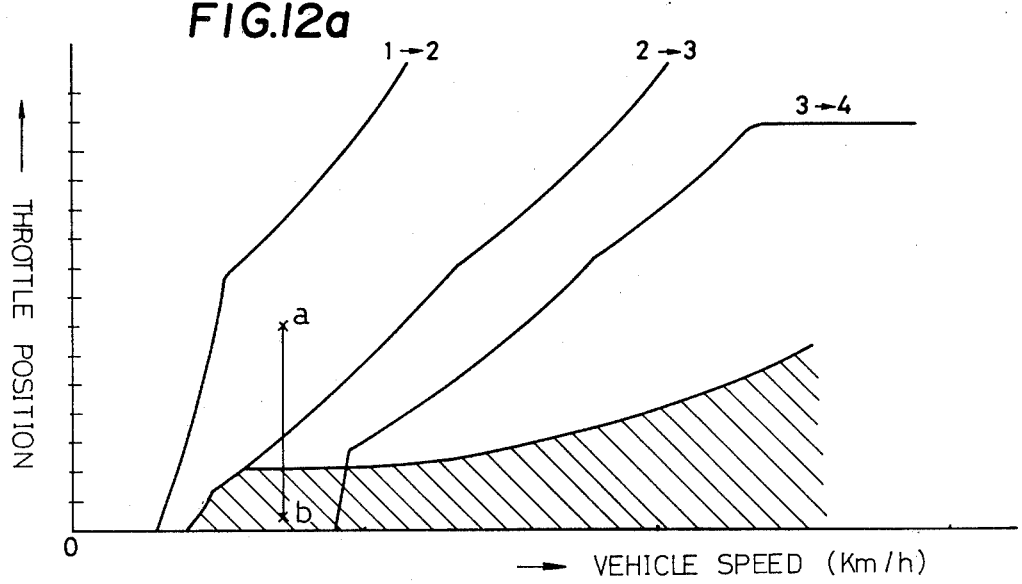
FIG. 12a graphically shows shift regions as indicated by different relations between the throttle openings and vehicle speeds.
Figure 12B:
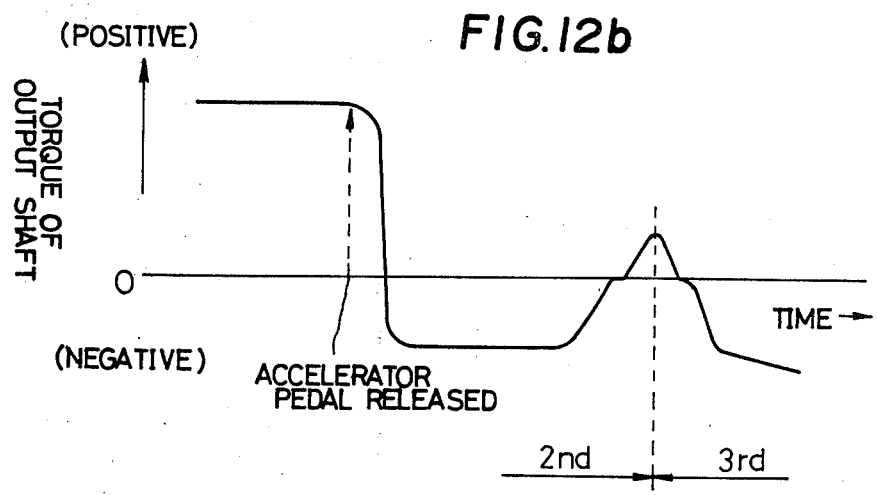
FIG. 12b graphically shows the torque from the output shaft of the transmission when the accelerator pedal is released when running on the second gear.

In the low portion of FIG. 9d, a flow chart portion subsequent to "OUT" refers to a pressure controlling operation by the solenoid 300 as well as timing control to turn the solenoids 310 and 320 on and off in order to prevent the occurrence of crank noises. A portion of the flow chart which relates to the prevention of crank noises will be described first. Initially, it will be appropriate to describe the occurrence of crank or drive train noises. Assume that a vehicle which is provided with the automatic, variable speed transmission as shown in FIG. 1 is running in an operating region a shown in FIG. 12a or in its second gear condition. When an accelerator pedal is suddenly released (power off) to a condition b, a 2→3 shift takes place in the process, which is referred to as a power off shift. Sound which results from the percussion of metals may occur during the power off shift, and is referred to as power off crank or drive train noises. Such crank or drive train noises are produced because the automatic transmission assumes a driven condition during the power off, producing a negative torque on its output shaft, representing a so-called engine brake activated condition. As shown in FIG. 12b, the output from the automatic transmission is a negative torque, and subsequently a 2→3 shift occurs, in the process of which a positive torque appears momentarily on the output shaft by the influence of a torque of inertia which results from the third gear synchronization. Subsequently, a negative torque prevails in the third gear condition. If the transition from a negative to a positive torque occurs too rapidly, a rattling of the entire drive system or drive train produce a percussion sound due to backlashes. FIG. 12a includes a hatched region where there is a likelihood to produce crank drive train noises.

Figure 12C:
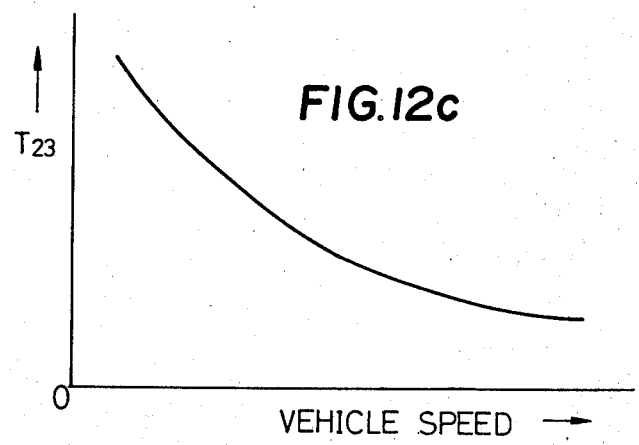
FIG. 12c shows graphically the delay time T23 stored in ROM and which is required to prevent the occurrence of crank noises during the 2→3 shift, shown as a function of the vehicle speed.
Figure 12D:
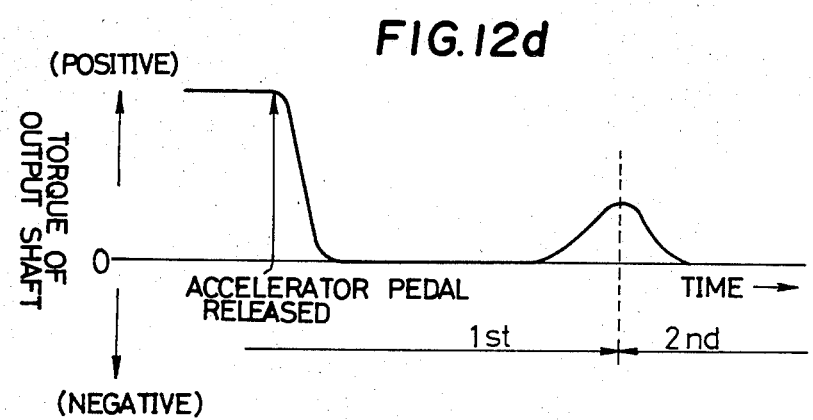
FIG. 12d graphically shows the torque from the output shaft of the transmission when the accelerator pedal is released while running in first gear.

In the automatic, variable speed transmission shown in FIG. 1, there is a likelihood to produce crank noises only when the accelerator pedal is released while running on the second gear condition. This will be understood by considering the fact that in the automatic transmission constructed as shown in FIG. 1, the one way clutch 28 prevents an engine brake from being activated while the vehicle is running on the first gear, so that in the event of the power off, what occurs is a reduction of the torque to zero without becoming negative, as indicated in FIG. 12d. Thus, if the 1→2 shift takes place subsequently to produce a positive torque, the excursion of the torque does not cross the zero axis, avoiding the occurrence of crank noises. Similarly, the existence of the one way clutch 13 prevents crank noises from being produced in the event of the power off and 3→4 shift. However, when the venicle is running in second gear, during which the brake 18 is active, an engine brake activated condition prevails in the event of the power off and may cause crank noises to be produced for the reason mentioned above. Consequently, in order to prevent the occurrence of such crank noises, it is necessary that a change of the throttle opening from an initial value to a value located within the hatched area shown in FIG. 12a be detected when the vehicle is in its second speed range (solenoids 300, 320 off and solenoid 310 on). The detection can be utilized to maintain all of the solenoids 300, 310 and 320 off during a time interval $T_{23}$ required for the rotation of the engine to be reduced to the third gear, thus achieving a neutral condition. After $T_{23}$ has passed, the solenoids are selectively energized to achieve a shift to the third gear, thus preventing the occurrence of crank noises. When the accelerator pedal is released while the vehicle is running on the second gear, the time required for the vehicle speed to be reduced to its third range depends on the vehicle speed prevailing at the time the accelerator pedal is released, as shown in FIG. 12c. Accordingly, the required time interval $T_{23}$ is stored in ROM 402-1, 402-2 at an address which is defined by a vehicle speed. When the accelerator pedal is released while the vehicle is running on the second gear, the time interval $T_{23}$ which corresponds to the prevailing vehicle speed is read out, and the 2→3 shift is effected after such time interval.

Figure 9E:
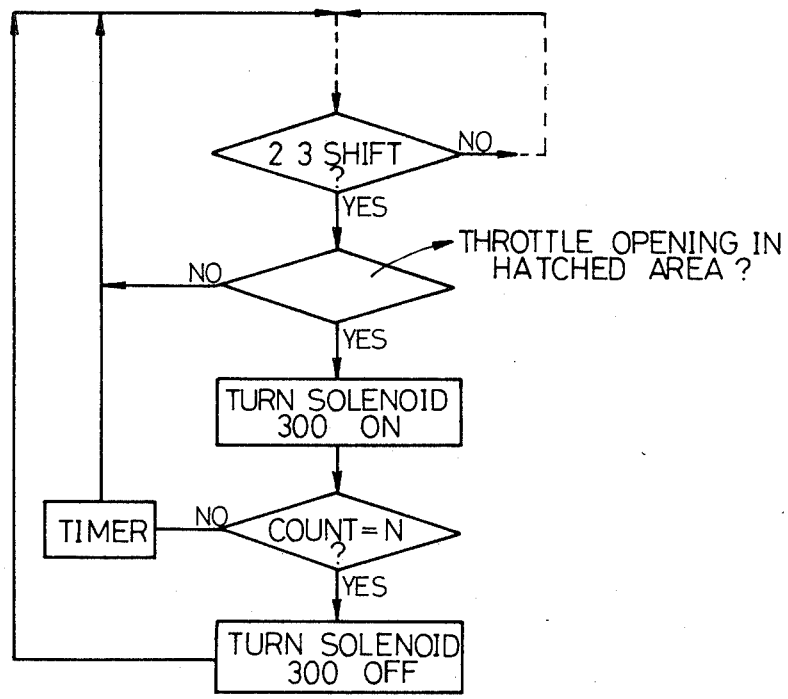
FIG. 9e is a flow chart schematically illustrating a control flow to prevent the occurrence of crank noises.
Figure 10A:
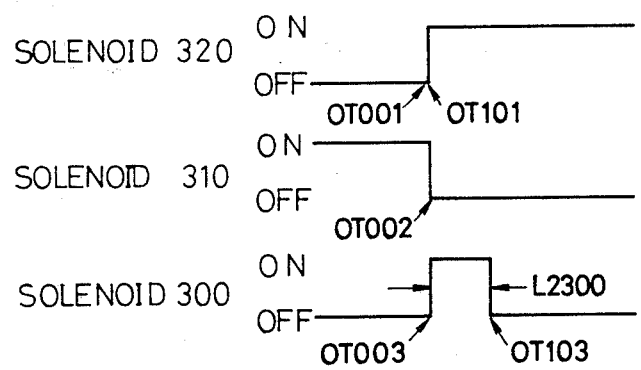
FIG. 10a is a series of timing diagrams, illustrating the timing when the solenoids are energized in order to prevent the occurrence of crank noises.
Figure 9G:
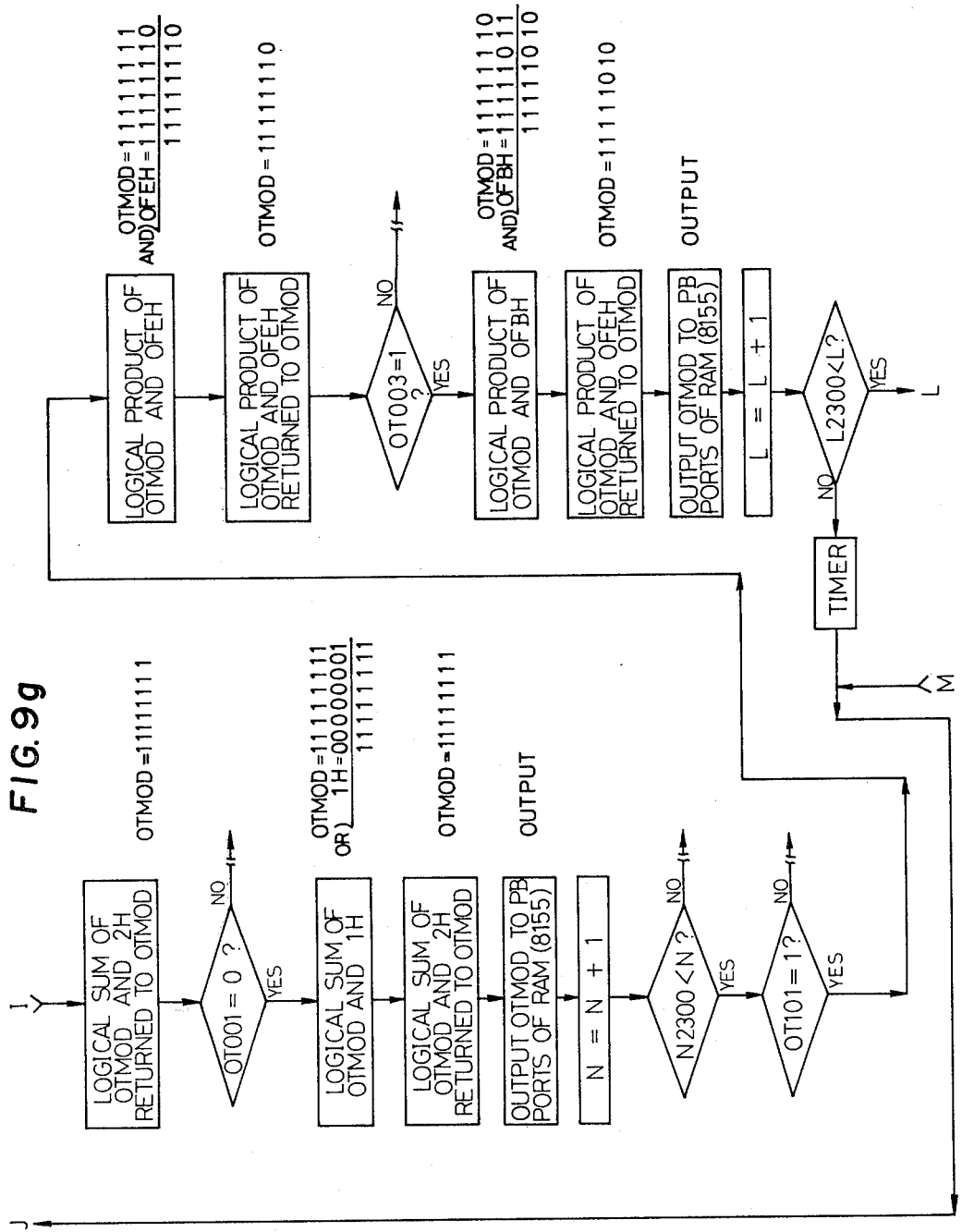
Figure 9H:
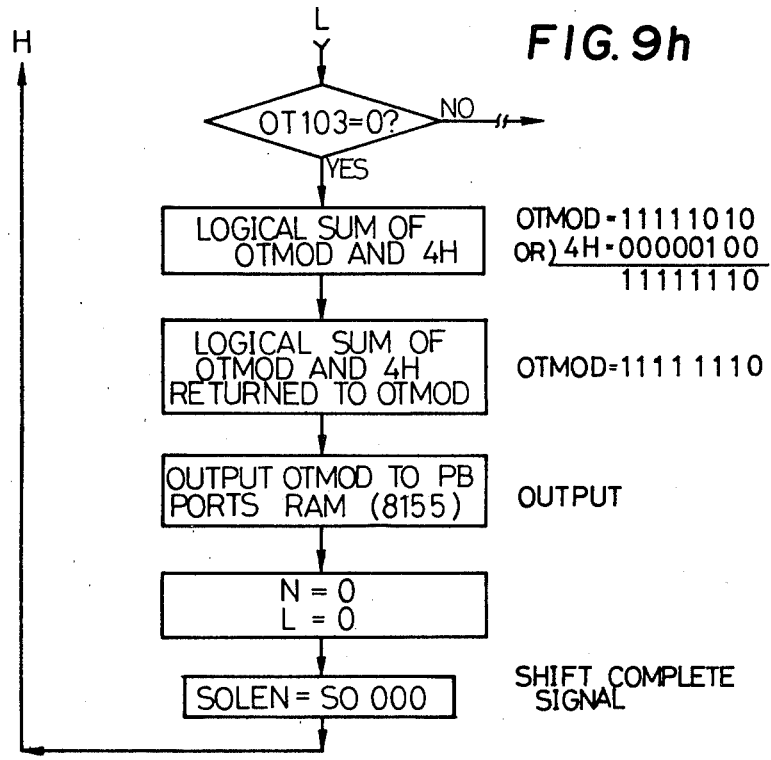

FIG. 9e shows a flow chart of a program which may be utilized to prevent the occurrence of crank noises while FIG. 10a shows a timing diagram which illustrates the required switching operation. FIGS. 9f to 9h show the program which is used to prevent the occurrence of crank noises in more detail. It should be understood that the time interval $T_{32}$ used with the 3→2 shift shown in FIG. 4 is determined in the similar manner as $T_{23}$.

Figure 10B:
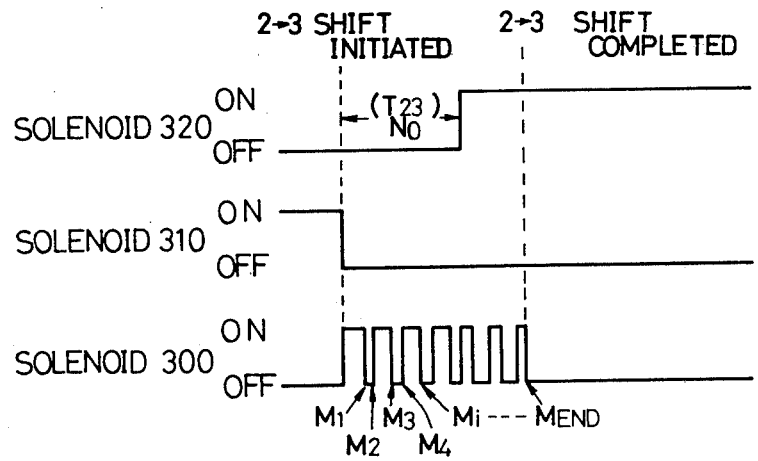
FIG. 10b is another series of timing diagrams indicating the timing for controlling the hydraulic pressure by the solenoid valve.

A pressure controlling operation by the solenoid 300 (which is indicated by a sloped curve portion in FIG. 4) will be described which is effected in order to prevent the occurrence of impulses during a shift operation. FIG. 10b is a timing diagram which indicates the detail of the timing with which the solenoids are energized during the 2→3 shift. FIG. 9i indicates a flow chart of a corresponding control. It will be appreciated that during the 2→3 shift, the solenoid 310 is turned off while the solenoid 300 is repeatedly turned on and off a given number of times. After $T_{23}$ which must be considered in order to prevent the occurrence of crank noises, the solenoid 320 is turned on, and after turning the solenoid 300 on and off a given number of times, it is finally turned off. During the repetitive energization of the solenoid 300, the on period at the initial phase of control is relatively long while it is reduced toward the end of control, which is effected by means of a timer program. In this manner, the pressure is increased gradually. In the repeated control of the solenoid 300, OUTN, OUTD, OT001, OT003 represent addresses in RAM 403 while $N_0$ represents a count data in the timer and M1 indicates the position where the solenoid is initially turned off. Similarly, Mk (K=1, 2, 3...) represents the position in time when the solenoid 300 is turned off and on (an even-numbered Mk representing a turn-on). Data "0" and "1" in OT001–OT003 represent "OFF" and "ON" data of the solenoids 320, 310 and 300. These data are successively updated in a manner such that when the time limit for the inversion of M1 is completed, $N_0$ is updated from its count for M1 to a count for M2. For each timeover (M1, M2, - - -), the energization of the respective solenoids 300, 310 and 320 are changed. An 8-bit data is stored at each address OTMOD. For example, the first digit "0" of 0000100 represents the "OFF" condition for the solenoid 320, the second digit "0" the "OFF" condition of the solenoid 310, and the third digit "1" the "ON" condition of the solenoid 300.

A similar pressure controlling operation by the solenoid 300 takes place during N→D, 1→2 and 3→4 shifts as well as a shift operation for the power off. However, because no crank noise is produced in these instances, there takes place no control over the ON-OFF time shift ($T_{23}$, $T_{32}$) between the solenoids 310 and 320.

Figure 9J:
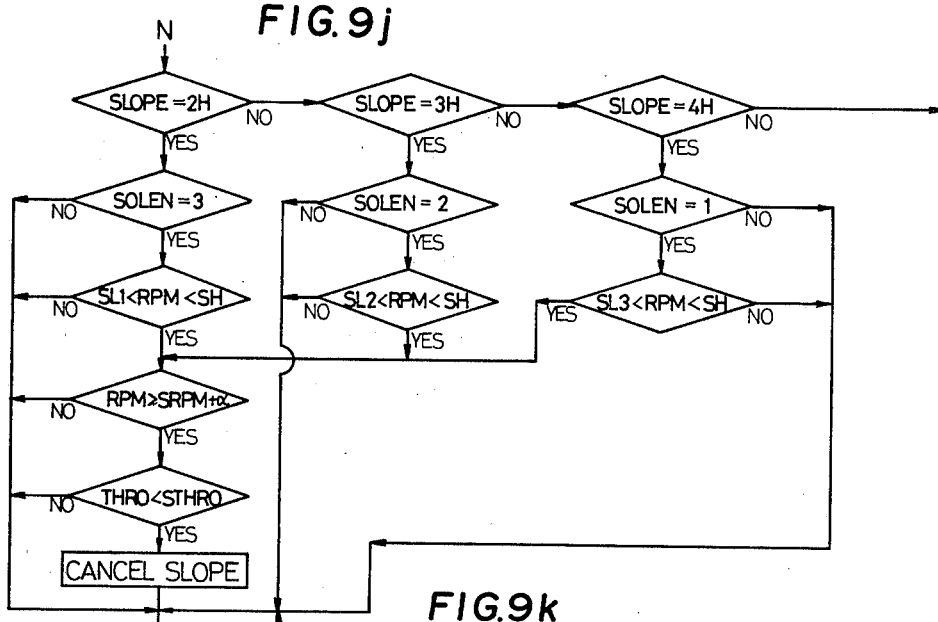
FIG. 9j is a flow chart illustrating a control flow to detect a slope termination.
Figure 9K:
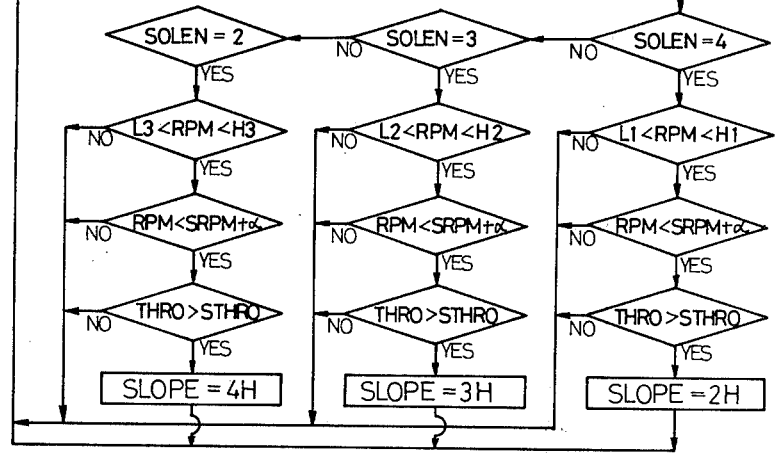
FIG. 9k is a flow chart of a slope detecting program.

Referring to FIGS. 9j and 9k, there are shown flow charts associated with an interrupt program. As mentioned previously, these interrupt programs relate to the detection of a slope (FIG. 9k) and the detection of a slope run-out or termination (FIG. 9j). Initially considering the detection of a slope, an equation of motion for a running vehicle is expressed as follows:

$$T = \mu_r W + \mu_a S V^2 + \frac{\alpha}{100} W + 0.278 \frac{(W + \Delta W)}{g} \frac{dV}{dt} \quad (1)$$

Where
T: the traction of a vehicle (kg)
$\mu_r$: coefficient of rolling resistance
$\mu_a$: coefficient of air resistance
W: the weight of vehicle (kg)
$\Delta W$: the equivalent weight of rotating part of the vehicle (kg) p1 S: the area of a front projection of the vehicle (m²)
V: vehicle speed (km/h)
(dV/dt): vehicle acceleration (km/h/sec)

α: gradient of a slope (%) (α = sin β, β represents the inclination of the slope)
g: gravitational acceleration (=9.8 m/sec²)

Representing the traction during a steady-state running on a flat road by $T_0$, it follows from the equation (1) that $$T_o = \mu_r W + \mu_a S V^2 \quad (2)$$

Figure 15B:
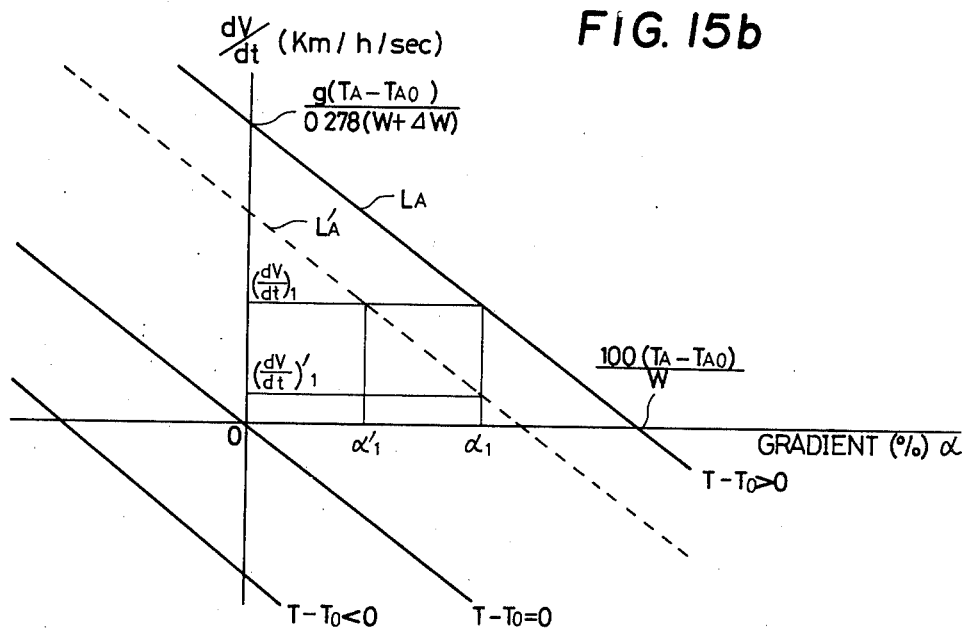
FIG. 15b shows relationship between the acceleration and the gradient of the road.
Figure 15A:
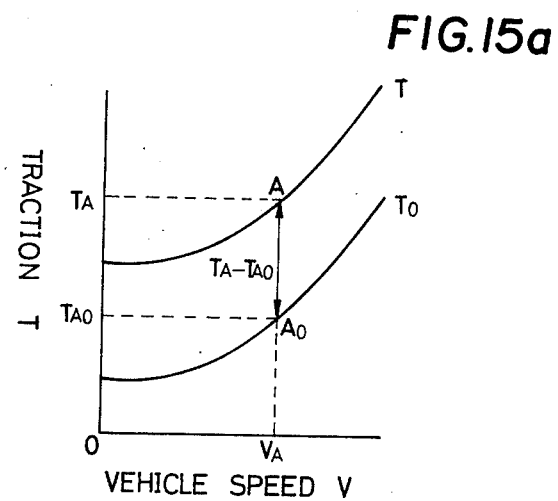
FIG. 15a graphically shows the magnitude of the traction force plotted against the vehicle speed.

The relationship between the equations (1) and (2) can be depicted on a T-V diagram as shown in FIG. 15a. Considering a running condition A on the curve T, the prevailing vehicle speed is indicated by $V_A$ while the traction is represented by $T_A$. During a steady-state running condition, a corresponding point $A_0$ on the curve $T_0$ for the same speed $V_A$ represent a traction $T_{A0}$. The difference of traction $T_A$-$T_{A0}$ between the running conditions A and $A_0$ represents a loading on the vehicle as referenced to the steady-state running condition on the flat road, and can be derived from the equations (1) and (2) as follows:

$$T_A - T_{A0} = \frac{\alpha}{100} W + 0.278 \frac{W + \Delta W}{g} \cdot \frac{dV}{dt} \quad (3)$$

When the expression of the equation (3) is depicted on α versus dV/dt diagram, it is shown by a rectilinear line $L_A$ shown in FIG. 15b.

Obviously, the steady-state running condition on the flat road is indicated by the origin O in FIG. 15b, and any other running condition is uniquely defined on FIG. 15b.

It will be appreciated from FIG. 15b that for the running condition A, the vehicle will be being accelerated with an acceleration of $g(T_A - T_{A0})/0.278(W + \Delta W)$ when it is running on the flat road. If the acceleration is zero, it will be running on a slope having the gradient of $100(T_A - T_{A0})/W$.

In a similar manner, when the road has a gradient of $\alpha_1$, the acceleration will be $(dV/dt)_1$. However, under any running condition, the gradient of a slope can be uniquely determined by detecting the traction T, the vehicle speed V and the acceleration dV/dt.

In the description given above, it has been presumed that the weight W of the vehicle is constant. However, it will be apparent from the equation (3) that the weight W is equivalent to the gradient and the accelration dV/dt as far as a loading on the vehicle is concerned. The broken lines $L'_A$ represent an increased weight relative to the line $L_A$. If the same acceleration $(dV/dt)_1$ is detected on the lines $L_A$ and $L'_A$ the gradient α will assume different values $\alpha_1$, $\alpha_1'$, indicating that the vehicle is running on different slopes. If the vehicle is running on the same slope $\alpha_1$, different values of acceleration $(dV/dt)_1$, $(dV/dt)'_1$ will be detected.

Hence, in the description to follow, the weight of the vehicle will not be considered when describing the process of controlling the shift in response to the detection of a slope, but it should be understood that the slope may alternatively be interpreted as representing "the weight of vehicle" or "a combination of the slope and the weight of vehicle".

Instead of detecting the traction T, the torque on the drive axle associated with the wheels, the throttle opening, the negative pressure prevailing in the intake tube of the engine or the like may be detected.

In the following description, the detection of the throttle opening will be relied upon.

FIG. 13a graphically shows various running conditions on the first gear on a throttle opening-vehicle speed diagram, with a parameter representing the gradient of the slope for which an acceleration of zero is assumed.

In a similar manner, in the present embodiment, an up slope running region, a flat road running region (slope run-out region) and a down slope running region are determined in accordance with the throttle opening and the vehicle speed as indicated in FIGS. 14a, 14b and 14c. The vehicle speeds on the higher and lower limit of each region are stored in ROM 402-1, 402-2 at addresses defined by the throttle opening, thus maintaining such vehicle speeds as reference data. A speed stage is determined from the energized or deenergized condition of the solenoids 300, 310 and 320 in the flow chart of FIG. 9k which detects the existence of a slope, and the actual vehicle speed is compared against a low limit L1 and a high limit H1 of an up slope contained in ROM for the selected gear and the throttle opening, thus determinig if the vehicle is running on a slope. In the flow chart of FIG. 9j in which the run-out condition is detected and the slope running is terminated, it is determined if the slope detected data which is currently retained corresponds to one of SLOPE=4H, 3H or 2H, and a determination is made whether or not the vehicle is running on a flat road in accordance with whether the actual vehicle speed lies in a range determined by the low limit SL1 and the high limit SH1 which are contained in ROM as run-out or termination condition. When the run-out condition is met, the slope running condition (FIG. 11b, 11c or 11d) is terminated, thus returning the shift reference data to the form shown in FIG. 11a.

For the sake of completing the description, the interrupt programs shown in FIGS. 9j and 9k will be described more specifically. In these programs, the acceleration or deceleration of the vehicle as well as the throttle opening are detected to determine a loading on the vehicle. For example, when running on the fourth gear (SOLEN=4: FIG. 9k), if an actual vehicle speed (RPM) at a given throttle opening ($\theta_1$) lies in a region defined by L1 and H1 shown in FIG. 14c, it is determined that a high loading is imposed on the vehicle. Representing the vehicle speed which prevails on the previous interrupt as SPRM, if the speed (RPM) which prevails at the current interrupt is less than SRPM or the vehicle is decelerating and if the throttle opening THRO which prevails at the current interrupt is equal to or greater than the throttle opening STHRO during the previous interrupt (namely, the accelerator pedal is maintained constant or is further depressed), it is determined that the vehicle is running on a slope and that a smooth running is not achieved because of too high a gear ratio. Accordingly, the speed stage is decreased from the fourth to the third gear, while outputting an instruction (SLOPE=2H) to inhibit an up shift until the end of the slope is reached. The same is true when running on the third or the second gear. Conversely, the instruction SLOPE=2H is terminated when the actual vehicle speed lies in a region defined by SL1 and SH1 in FIG. 14a and hence a loading on the vehicle is determined not to be excessive. Subsequently, if the vehicle speed (RPM) at the current interrupt is greater than the vehicle speed SRPM during the previous interrupt (that is, when the vehicle is being accelerated) and if the throttle opening THRO at the current interrupt is equal to or less than the throttle opening STHRO at the previous interrupt, a determination is made that the vehicle has terminated running on the slope, and hence an output is produced to terminate the instruction SLOPE so as to enable a normal running. The same is true for SLOPE=3H or 4H. The purpose of utilizing data contained in ROM to constrain an up shift depending on the speed stage and in accordance with the loading on the vehicle is to prevent a frequent an up and down shift when the vehicle is running on a slope or running with a heavy loading. By controlling the shift operation in accordance with the gradient of the slope under the loading on the vehicle, an accelerating or decelerating characteristic is achieved at running speed which is free from the hunting effect and which is appropriate to the gradient of the slope under loading on the vehicle, eliminating problems experienced in the prior art that a deceleration occurs even though the accelerator pedal is depressed or that a reduced effect of the engine brake requires a frequent use of the brake, which is subject to seizure. In this manner, a smooth and sophisticated automatic control of the speed change is achieved.

The operation of the electronic digital control system 400 can be summarized as follows:

1. As shown in FIG. 10b, during a shift operation, the solenoid valve 300 is turned on and off repeatedly to control the pressure, thus preventing the occurrence of impulses during the shift operation.
   a. In the 2→3 or 3→2 shift operation during which crank noises may be produced, the energization of the solenoid valve 320 (2→3 shift) and the deenergization of the solenoid valve 300 (3→2 shift) are delayed by a time interval of $T_{23}$ or $T_{32}$.
3. The digital encoder of rotary type which produces a Gray code is used as the throttle opening sensor, preventing codes which significantly deviate from the actual throttle opening from being produced, thus minimizing an error in a throttle opening being read.
4. The running of the vehicle on the flat road or the slope (as well as running with a heavy loading) is automatically detected, and a particular shift reference data is determined in accordance therewith and also with the speed stage, thus enabling a reasonable shift operation to be performed automatically, avoiding the occurrence of a hunting phenomenon or an overheating of the brake.

What is claimed is:

1. A system for controlling an automatic variable speed transmission including a hydraulic circuit having a plurality of oil pressure control valves and flow path switching means for selectively engaging or disengaging clutches and brakes of the transmission, and a plurality of solenoid valves associated with a shift operation, said system comprising electronic control means responsive to shift lever position, vehicle speed and throttle opening, and having gear ratio change reference data for providing control signals to said solenoid valves to thereby control the operation of the transmission wherein: said electronic control means includes memory means having shared therein slope detecting reference data indicative of the upper and the lower limit value of vehicle speed corresponding to a throttle opening for each of a selected number of slope running loadings and for each speed stage: gear ratio means for detecting and comparing the actual speed stage, the actual throttle opening, the actual speed of the vehicle and the change rate of the actual speed against said slope detecting reference data and means to modify the gear ratio change reference data to inhibit up-shifting on a slope to prevent hunting of gear ratios on an up slope and an undue need for braking on a down slope.

2. A system as claimed in claim 1, wherein said electronic control means controls the hydraulic pressure of the hydraulic control circuit for a given time interval depending on a shift mode during a shift operation of the transmission by a repeated energization and deenergization of the pressure controlling solenoid valve.

3. A system as claimed in claim 2, wherein the "on" and "off" time during the repeated energization and deenergization of the pressure controlling solenoid valve have a different length of time at an earlier point in a time sequence than at a later point in the time sequence.

4. A system as claimed in claim 1, wherein the electronic control means delays the timing at which the shift controlling solenoid valves are deenergized and energized by a given time interval whenever a selected shift mode of the transmission involves a likelihood to produce crank noises.

5. A system as claimed in claim 4, wherein the time interval depends on the vehicle speed which prevails when releasing an accelerator pedal.

6. A system as claimed in claim 1, wherein the electronic control means is operative during a shift operation of the transmission to control the hydraulic pressure of the hydraulic control circuit for a given time interval which depends on a shift mode, by repeatedly energizing and deenergizing the pressure controlling solenoid valve, and operative during a selected shift mode of the transmission during which the transmission involves a likelihood to produce crank noises for delaying the timing at which the shift controlling solenoid valves are deenergized and energized by a given delay time.

7. A system as claimed in claim 6, wherein the given delay time depends on the vehicle speed which prevails when releasing an accelerator pedal.

8. A system as claimed in claim 6, the "on" and "off" time in the repeated energization and deenergization of the pressure controlling solenoid valve has a different length of time at an earlier point in a time sequence than at a later point.

* * * * *